(12) United States Patent
Farcasiu et al.

(10) Patent No.: US 8,595,269 B2
(45) Date of Patent: Nov. 26, 2013

(54) MANAGING CLASSIFICATION HIERARCHIES IN MASTER DATA MANAGEMENT ENVIRONMENTS

(75) Inventors: Alexandru M. Farcasiu, Southlake, TX (US); Subramanian Radhakrishnan, Chennai (IN)

(73) Assignee: Infosys Limited, Bangalore (IN)

( * ) Notice: Subject to any disclaimer, the term of this patent is extended or adjusted under 35 U.S.C. 154(b) by 12 days.

(21) Appl. No.: 13/274,178

(22) Filed: Oct. 14, 2011

(65) Prior Publication Data

US 2013/0060825 A1  Mar. 7, 2013

(30) Foreign Application Priority Data

Sep. 2, 2011  (IN) ............................ 3014/CHE/2011

(51) Int. Cl.
*G06F 7/06* (2006.01)
*G06F 17/30* (2006.01)

(52) U.S. Cl.
USPC ............ 707/804; 707/603; 707/805; 707/812

(58) Field of Classification Search
None
See application file for complete search history.

(56) References Cited

U.S. PATENT DOCUMENTS

| | | | |
|---|---|---|---|
| 6,466,971 B1 | 10/2002 | Humpleman et al. | |
| 6,546,419 B1 | 4/2003 | Humpleman et al. | |
| 6,581,094 B1 | 6/2003 | Gao | |
| 6,585,778 B1 | 7/2003 | Hind et al. | |
| 6,618,764 B1 | 9/2003 | Shteyn | |
| 6,725,281 B1 | 4/2004 | Zintel et al. | |
| 6,738,951 B1 | 5/2004 | Weiss et al. | |
| 6,763,460 B1 | 7/2004 | Hild et al. | |
| 6,788,768 B1 | 9/2004 | Saylor et al. | |
| 6,798,867 B1 | 9/2004 | Zirngibl et al. | |
| 6,826,597 B1 | 11/2004 | Lonnroth et al. | |
| 7,032,181 B1 | 4/2006 | Farcasiu | |
| 7,043,532 B1 | 5/2006 | Humpleman et al. | |
| 7,065,562 B2 | 6/2006 | Courtney | |
| 7,162,534 B2 | 1/2007 | Schleiss et al. | |
| 7,184,801 B2 | 2/2007 | Farcasiu | |
| 7,356,615 B2 | 4/2008 | Cai et al. | |
| 7,840,631 B2 | 11/2010 | Farcasiu | |
| 7,890,091 B2 | 2/2011 | Puskoor et al. | |
| 2002/0087655 A1 | 7/2002 | Bridgman et al. | |
| 2007/0214179 A1* | 9/2007 | Hoang | ...................... 707/104.1 |
| 2008/0270363 A1 | 10/2008 | Hunt et al. | |

(Continued)

OTHER PUBLICATIONS

Wolter, et al., "The What, Why, and How of Master Data Management," Microsoft Corporation, Nov. 2006, 11 pages.

(Continued)

*Primary Examiner* — Bruce Moser
(74) *Attorney, Agent, or Firm* — Klarquist Sparkman, LLP

(57) ABSTRACT

Apparatus and methods are disclosed for managing master data in a master data management (MDM) environment using classification hierarchies. According to one embodiment of the disclosed technology, a method of classifying master data includes receiving a classification hierarchy defining one or more dimensions and one or more relations between a set of hierarchy levels, generating a dimensional level by associating at least one of the dimensions with a hierarchy level, the dimension defining a set of valid values for nodes associated with the dimensional level, associating one or more nodes with the dimensional level, and generating master data classifications for an MDM environment based on the classification hierarchy and the associated nodes, where one or more objects of the master data classifications are assigned valid values based on the associated nodes.

20 Claims, 20 Drawing Sheets

(56) References Cited

U.S. PATENT DOCUMENTS

| | | |
|---|---|---|
| 2008/0294583 A1 | 11/2008 | Hunt et al. |
| 2008/0294996 A1 | 11/2008 | Hunt et al. |
| 2009/0006156 A1 | 1/2009 | Hunt et al. |
| 2009/0012971 A1 | 1/2009 | Hunt et al. |
| 2009/0018996 A1 | 1/2009 | Hunt et al. |
| 2011/0078201 A1* | 3/2011 | Ryan et al. .................. 707/792 |

OTHER PUBLICATIONS

Wikipedia, "Master Data Management," downloaded from the Internet on Jul. 11, 2011, 5 pages.

Wolter, "Master Data Management (MDM) Hub Architecture," Microsoft Corporation, Apr. 2007, 18 pages.

* cited by examiner

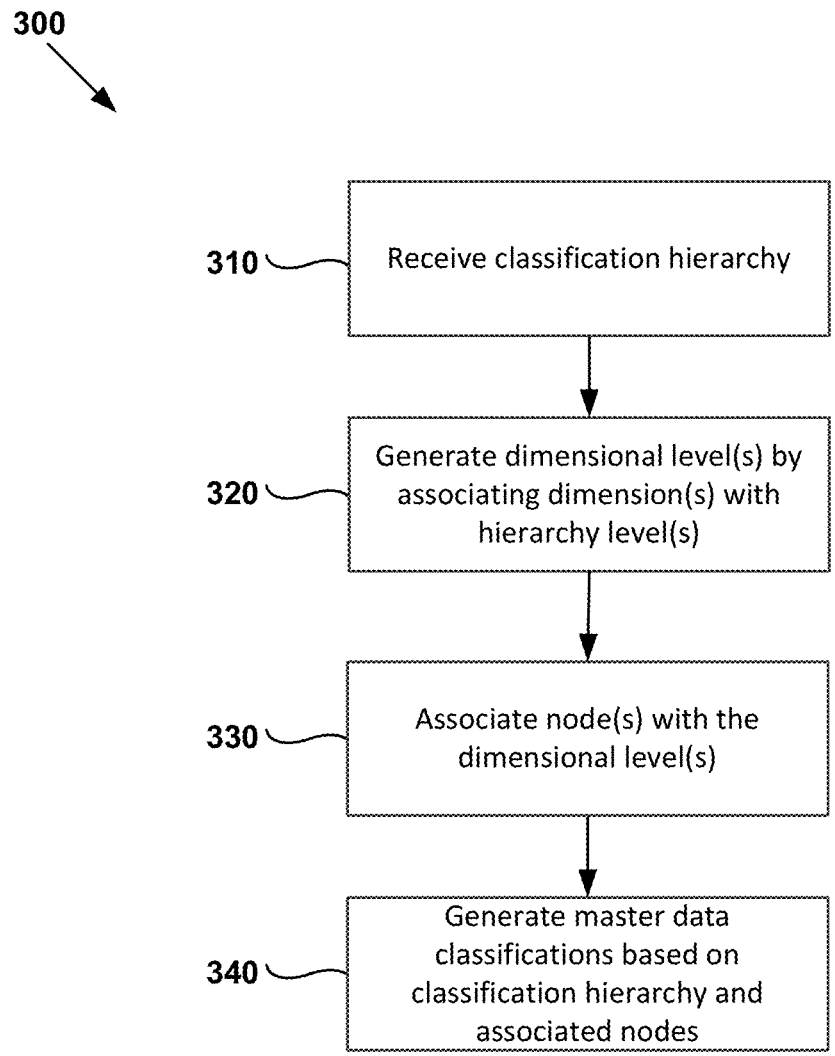

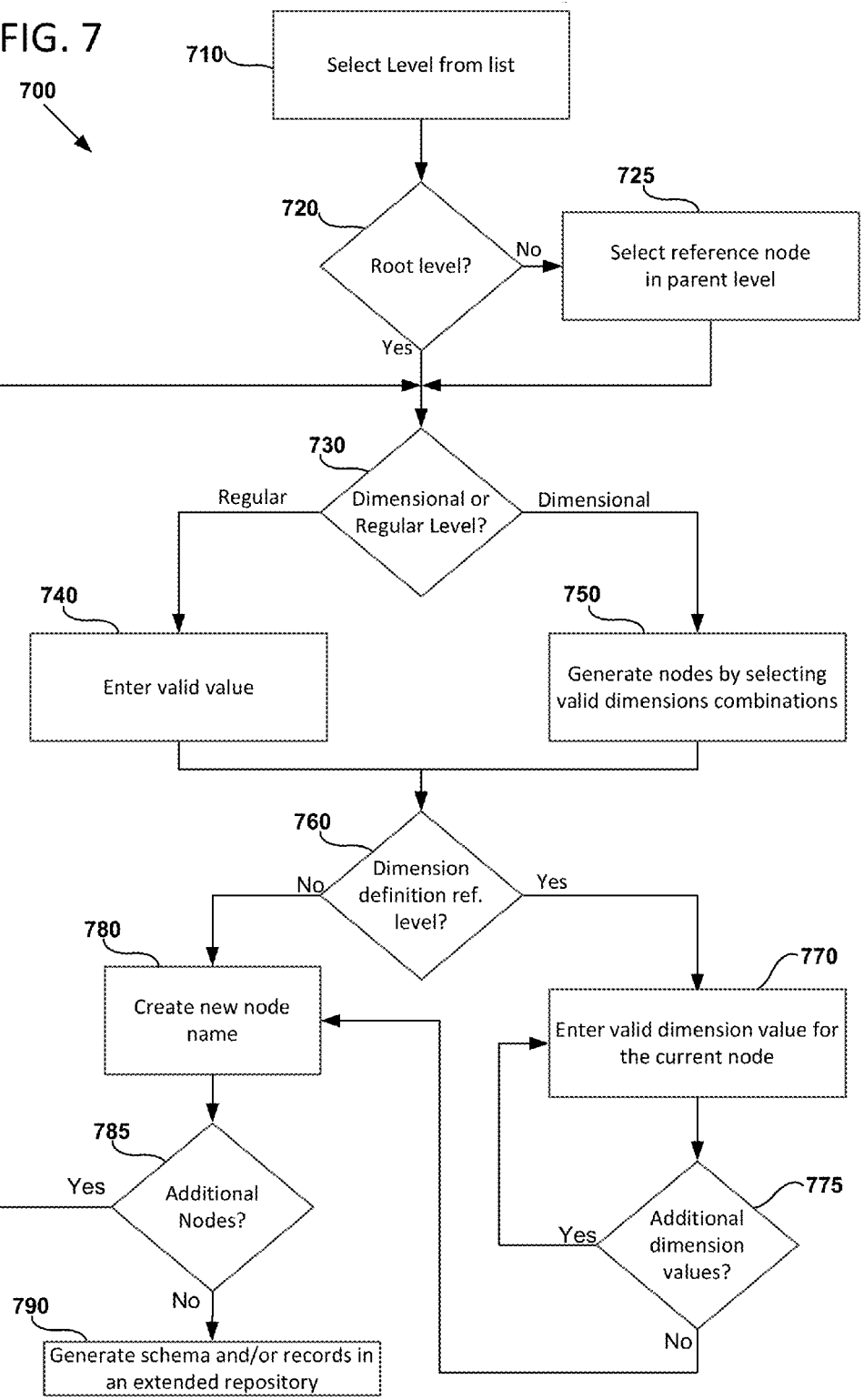

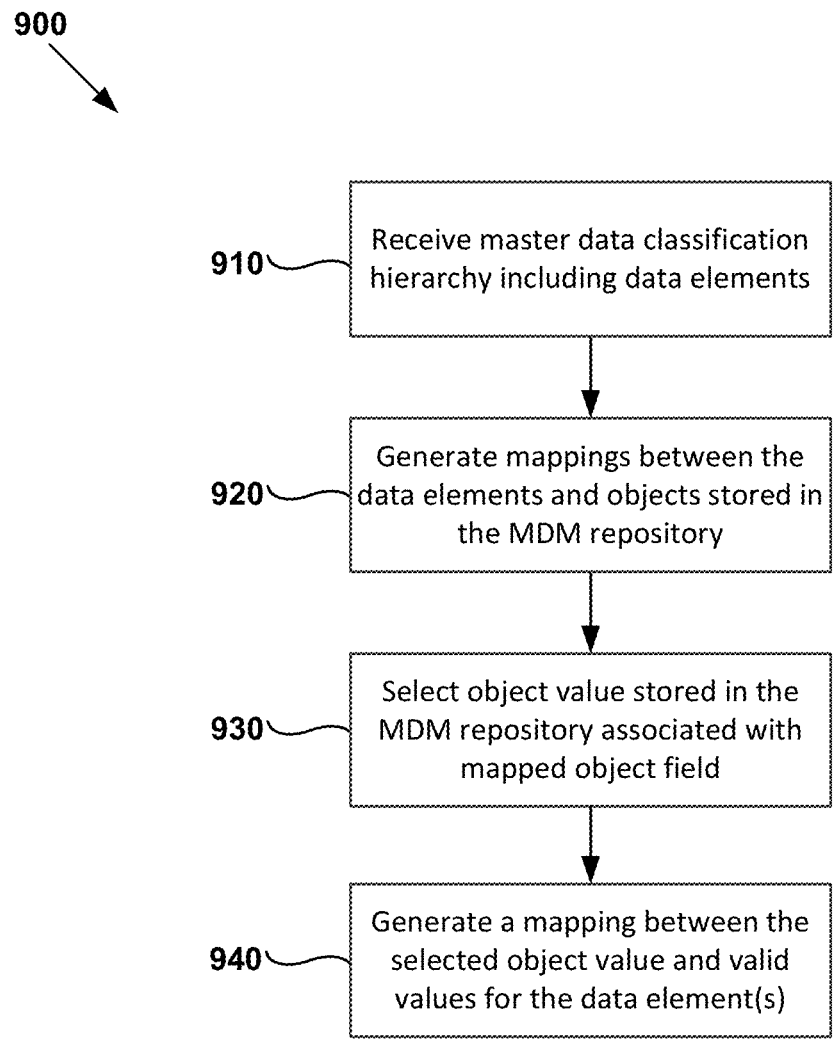

MANAGING CLASSIFICATION HIERARCHIES IN MASTER DATA MANAGEMENT ENVIRONMENTS

CROSS REFERENCE TO RELATED APPLICATION

This application claims the benefit of and priority to prior India Patent Application No. 3014/CHE/2011, entitled "MANAGING CLASSIFICATION HIERARCHIES IN MASTER DATA MANAGEMENT ENVIRONMENTS," filed in India on Sep. 2, 2011, the entire disclosure of which is hereby incorporated herein by reference.

FIELD

The present disclosure pertains to apparatus and methods for analyzing, modifying, and viewing hierarchies, records, and metadata for master data management (MDM) systems.

BACKGROUND

Master data management (MDM) technology typically includes a set of processes and tools that define non-transactional entities of an organization in a persistent manner. These non-transactional entities can include customers, products, items, vendors, employees, users, or other suitable non-transactional entities. These non-transactional entities, also referred to as master data, are important assets for a company. The scope of Master Data Management includes creation as well as maintenance of such master data.

There are a number of commercial MDM products in the market, which are supplied by vendors such as IBM (e.g., IBM-WPC), SAP (e.g., SAP-MDM), and Tibco (e.g., Tibco-CIM). These existing commercial MDM products do not completely facilitate the master data management process. For example, users of these commercial MDM products desire degrees of customization and flexibility that are not completely satisfied by any of these products.

Currently-available commercial MDM products come with their own bundled user interface (UI) and provisions to model MDM data according to a particular MDM system's requirements. The products can provide a limited set of features that facilitate processes related to item creation, item-search, item-copy, search, data quality, data enrichment, and other suitable features. Further, the user interface bundled with MDM products is typically not easily customizable to include new screens and functionality. This restricts the business process and use cases of MDM users, forcing them to change or limit their business processes. Data models supported by MDM products also have limited flexibility when it comes to modeling various MDM entities and relations.

SUMMARY

Apparatus, computer-readable storage media, and methods are disclosed for rapid development of standardized data classification hierarchies for use with Master Data Management (MDM) products, rapid development of mapping tables for data integration, including field-value level semantic mapping, and rapid mapping of a data classification hierarchy to multiple presentation views, allowing various categories of users to view MDM data in a manner customized to a particular user's role with an organization.

In some examples, the disclosed techniques utilize various modules of a universal MDM PAIP (Product Abstraction and Integration Platform). Universal MDM PAIP components address limitations of off-the-shelf MDM products by extending available features of commercial MDM Products. The PAIP can serve as a standalone, low-cost alternative to jump-start MDM efforts (e.g., evaluation or migration efforts) and can be used to help to users select a full-fledged MDM Product. The PAIP can also provide smooth integration of external tools lacking in many commercial MDM implementations, allowing reuse of software components.

Combining a PAIP architecture with a Service-Oriented Architecture (SOA) increases reusability and flexibility. Consumers of MDM services are not exposed to the complexities of a service implementation or even a particular MDM vendor's implementation. Thus, disclosed PAIP architectures are designed to provide an MDM-agnostic platform.

Data models disclosed herein can be designed taking into consideration the various domain entities and relationships that are not used in existing MDM platforms. The data models can be realized on a variety of suitable database implementations, thereby enhancing the tools-agnostic attributes of PAIP implementations.

In some examples of the disclosed technology, a computer-implemented method of developing master data classifications for an MDM environment includes receiving a classification hierarchy defining one or more dimensions and one or more relations between a set of hierarchy levels, each of the hierarchy levels representing a collection of related objects in the MDM environment, and each of the dimensions representing a set of valid values for one or more nodes in the classification hierarchy. The method can further include generating a dimensional level by associating at least one of the dimensions with a level of the set of hierarchy levels, the at least one dimension defining a set of valid values for nodes associated with the dimensional level, associating the dimensional level with one or more nodes, and generating master data classifications for the MDM environment based on the classification hierarchy and the associated nodes, the master data classifications including one or more objects assigned valid values based on the dimensional level and the associated nodes. In some examples, the dimensions can be independent dimensions, dependent dimensions, or both independent and dependent dimensions.

In some examples of developing master data classifications, a method further includes storing the master data classifications in an MDM repository, generating a revised classification hierarchy based on the received classification hierarchy, the dimensional level, and the associated nodes, and storing the revised classification hierarchy in an extended repository.

In some examples of the disclosed technology, a computer-implemented method of generating mappings between objects in an MDM repository and a master data classification hierarchy stored in an extended repository includes receiving the master data classification hierarchy, the classification hierarchy defining relations between data elements of the classification hierarchy and definitions of valid values for one or more of the data elements, and based on the master data classification hierarchy, generating one or more mappings between the data elements and a respective one or more object fields stored in the MDM repository to produce mapped object fields.

In some examples, a method of generating mappings further includes selecting an object value associated with at least one of the mapped object fields, the object value being stored in the MDM repository and generating a mapping between the object value and one or more valid values for a data element mapped to the object field, the value values being determined by at least one of the relations of the master data classification hierarchy. In some examples, the mappings are stored in an extended repository.

In some examples of the disclosed technology, a computer-implemented method of generating one or more presentation hierarchies for an MDM environment includes receiving a classification hierarchy for the MDM environment, generating one or more presentation hierarchies for the MDM environment, each of the presentation hierarchies being associated with a user role in the MDM environment, each of the presentation hierarchies including one or more presentation levels, selecting one of the presentation levels, selecting a level of the classification hierarchy to map to the selected presentation level, and generating a mapping between the selected level of the presentation hierarchy and one or more corresponding nodes of the selected classification hierarchy level.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures.

BRIEF DESCRIPTION OF THE DRAWINGS

FIG. 3 is a flow chart that illustrates a generalized example of a method of developing a master data classification hierarchy for an MDM environment.

FIG. 7 is a flow chart that illustrates a generalized example of a method of generating nodes and node values for a master data classification hierarchy.

FIG. 9 is a flow chart that illustrates a generalized example of a method of generating mappings for a master data classification hierarchy for an MDM environment.

DETAILED DESCRIPTION

Introduction

Figure 1:
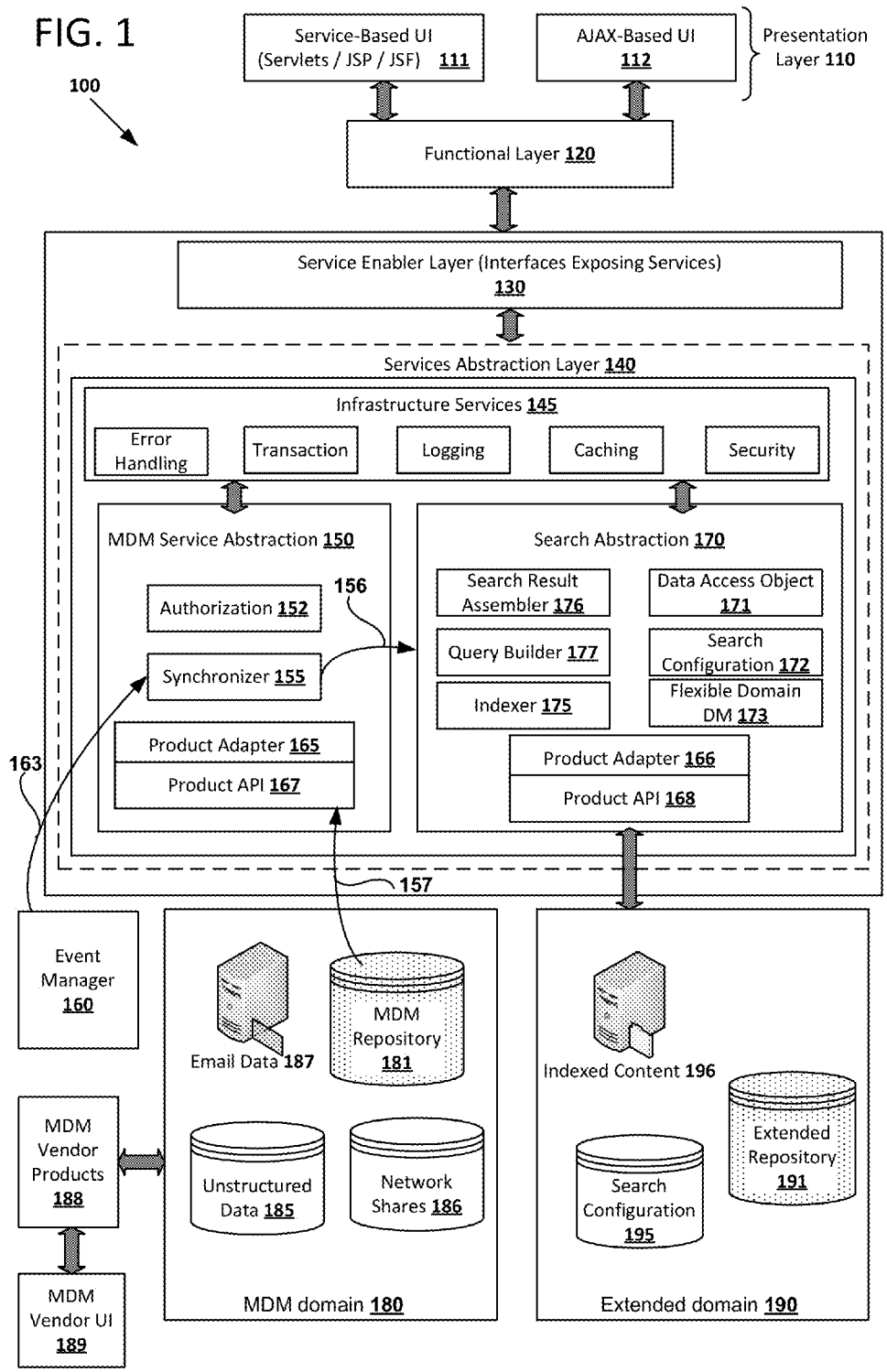
FIG. 1 is a block diagram illustrating a generalized example of a suitable Master Data Management (MDM) Product Abstraction and Integration Platform (PAIP) system in which described embodiments, techniques, and technologies can be implemented.

This disclosure is set forth in the context of representative embodiments that are not intended to be limiting in any way.

As used in this application and in the claims, the singular forms "a," "an," and "the" include the plural forms unless the context clearly dictates otherwise. Additionally, the term "includes" means "comprises."

The systems, methods, and apparatus disclosed herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Furthermore, any features or aspects of the disclosed embodiments can be used in various combinations and sub-combinations with one another. Furthermore, as used herein, the term "and/or" means any one item or combination of items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged, omitted, or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "receive," "produce," "generate," "associate," "select," "search," and "provide" to describe the disclosed methods. These terms are high-level abstractions of the actual operations that are performed. The actual operations that correspond to these terms can vary depending on the particular implementation and are readily discernible by one of ordinary skill in the art.

Any of the disclosed methods can be implemented with computer-executable instructions stored on one or more computer-readable storage media (e.g., non-transitory computer-readable media, such as one or more volatile memory components (such as DRAM or SRAM), or nonvolatile memory components (such as hard drives) and executed on a computer. Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially-available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, JavaScript, Perl, Python, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Theories of operation, scientific principles, or other theoretical descriptions presented herein in reference to the systems, methods, and apparatus of this disclosure have been provided for the purposes of better understanding and are not intended to be limiting in scope. The systems, methods, and apparatus in the appended claims are not limited to those systems, methods, and apparatus that function in the manner described by such theories of operation.

Any trademarks used herein are used for illustrative purposes only and are the property of their respective owners.

Example MDM PAIP Architecture

FIG. 1 illustrates an exemplary universal MDM PAIP architecture 100 that complements features of the existing MDM products by providing improved user interface usability, process automation capabilities, reporting and analyzing facilities, and other features. In some examples, a Service Abstraction Layer is provided to decouple presentation and/or data layers from MDM components. A product adapter interface layer is provided such that a number of MDM components can be integrated with the MDM PAIP.

An exemplary high-level architecture 100 for an MDM PAIP system is illustrated in FIG. 1. As shown, the high-level architecture 100 includes a presentation layer 110, a functional layer 120, a service enabler layer 130, and a service abstraction layer (SAL) 140. As shown in FIG. 1, these layers 110, 120, 130, and 140 are added to interact with an MDM domain 180 and an extended domain 190.

The MDM domain 180 includes at least one MDM Repository 181, which is specific to an MDM environment (e.g., a commercial MDM implementation). Master data is stored in the MDM repository, and additional data can be accessed within the MDM domain, for example, E-mail data 187 (e.g., stored on an SMTP server), unstructured data 185 (e.g., data stored in other databases or filesystems), and network data 186 (e.g., data stored on SMB or NFS network shares). Access to the MDM repositories 181 can be obtained through product-specific APIs 167 that communicate with the SAL 140. The MDM domain is accessed by standard MDM vendor products 188 using an MDM vendor UI 189, which are both typically provided by a commercial MDM vendor. Hence, the vendor products 188 and UI 189 can be referred to as "out-of-the-box" components.

The Extended domain 190 includes at least one extended repository 191, which can be built based on a generic data model and used to store information outside of the MDM domain 180. For example, information specific to the client and/or other information that cannot be supported by the MDM product can be stored in the extended repository 191 in the extended domain 190. Additional data, such as search configuration data 195 and indexed content 196 can also be stored in the extended domain 190, and can be used, for example, to stored index data generated by an indexer 175 and to produce search results and query results to a search result assembler 176 and query builder 177, respectively. Search functionality can be configured with a search configuration engine 172, which stores search settings as search configuration data 195. Thus, at least a portion of the extended domain 190 includes computing resources not provided by an MDM system.

The presentation layer 110 is a customized user interface (UI) used to present data to users, and can include the use of a service-based UI 111 (e.g., a UI based on Java Servlets, JavaServer Pages (JSP), and/or JavaServer Faces) and/or an AJAX-based (Asynchronous Java and XML) UI 112. The presentation layer 110 can be a different, customized user interface than the interface that is provided out-of-the-box by the MDM vendors (e.g., MDM Vendor UI 189). In some examples, the functional layer 120 represents services specific to a client as per-use cases. The functional layer 120 can aggregate calls on an MDM core service layer. The functional layer 120 is responsible for handling method-level transactions.

In some examples, a Service Enabler Layer (SEL) 140 allows MDM services to be exposed in a protocol-friendly manner. The SEL 140 enables MDM services to be accessible by consumers using multiple communication protocols based on suitability and design choice. For example, SOAP (Simple Object Access Protocol), HTTP (Hypertext Transfer Protocol), RMI (Remote Method Invocation), DWR (Direct Web Remoting), and Web Services (e.g., Java API for XML Web Services (JAX-WS)) protocols are examples of suitable communication protocols for enabling such MDM services.

In the example shown, the SEL 130 is the layer that interacts directly with the service consuming applications via the functional layer 120 and/or presentation layer 110. By using the SEL 130, there is no direct connection between service consumers and the SAL 140, thus hiding implementation complexity from the outside world.

Specifics regarding how the SAL 140 is called and the type of data that is transferred can be specified by a service contract and/or data contract. Two approaches to implementing the SEL 130 include a Web Services Approach and a Delegate Approach.

In a Web Services approach, a services contract is enabled as a web service that can be consumed by the consumers using SOAP request and responses.

In a delegate approach, a delegate class uses a services contract to access an MDM repository (e.g., MDM repository

181). Delegate class methods can be consumed by other applications through requests and responses.

The MDM PAIP system 100 can provide a number of infrastructure services 145, such as shown in FIG. 1, including: error handling, transaction handling, logging, caching, and communication-level security and authentication. Infrastructure services 145 can be provided by an enterprise application server environment where one or more solution components are deployed and hosted. The Service Enabler Layer 130 can provide an abstraction to leverage these infrastructure services 145 using an application server.

The MDM PAIP system 100 components provide functionality, including the ability to store structured and unstructured information, to update product releases (e.g., to update standards for data synchronization), and to use a metadata-driven flexible data model. The MDM PAIP system 100 components can be built considering Service-Oriented Architecture (SOA) technology.

In some examples, the Service Abstraction Layer (SAL) 140 provides a set of interface methods that represent atomic services that can be exposed to MDM service consumers, thus abstracting implementation details of MDM services from the consumers. Examples of interfaces that are provided in the SAL 140 include: Entity Manager, Hierarchy Manager, Meta Data Manager, Relationship Manager, Service Manager, and Security Manager. The SAL 140 interface can be used to provide system contracts and can be implemented using Java classes.

The SAL 140 provides a high level of abstraction to the atomic services that are exposed on one or more MDM repositories to users. The abstraction provided by the SAL 140 loosely includes an MDM service abstraction 150, which provides access to MDM services, and a search abstraction 170, which provides access to search and indexing services based on the extended domain 190. Thus, the search abstraction 170 can be used to search for data across multiple MDM domains (e.g., MDM domain 180).

In some examples, the SAL 140 can be further defined as providing three interface layers: a core service layer, a business layer and a data access layer. Service managers can execute business logic to transparently handle requests from service consumers.

The core service layer provides access to a service contract that includes interfaces to operations exposed to consumers. The core service layer also provides access to atomic methods to create and update a master data entity. In some implementations, the core service layer communicates with the business layer.

The business layer handles business implementation of services. Business rules to be applied before data is persisted can be implemented in the business layer.

The data access layer can be implemented through Data Access Object (DAO) layers 171 that interact with a product adapter 166 to persist data to vendor databases or Object/Relational Mapping tools (e.g., a Hibernate framework) to persist data to the extended repository. Using DAOs 171 introduces an abstraction between the data layer and the business layer, essentially hiding the database implementation details from the business layer. Thus, using DAOs 171 acts as a façade for data access to the MDM extended repository.

Value types are objects that can be serialized and can be used for communication with services. In some examples, value types depict object state but not object behavior.

Domain models are feature-rich models of value objects that can have additional methods, allows the domain models to depict both object behavior and state. Domain models also provide primary key-foreign key relationships between value objects.

As shown, a data synchronizer 155 is activated upon receiving trigger events from a listener. Once triggered, an incremental synchronization process is initiated to update 156 the content indexes and the extended repository with data changes detected in the MDM Repository 181. The data synchronizer 155 thus ensures that the extended repository 191 is synchronized with the MDM repository 181.

The data synchronizer 155 can be implemented as an asynchronous event handling mechanism wherein messages (e.g., messages requesting an action) are put into a queue (e.g., a Java Message Service (JMS) queue). The data synchronizer 155 can have a listener component listening to the queue. Upon arrival of a message, the data synchronizer 155 pulls 157 data from the MDM repository 181 and pushes data (e.g., by sending data from the MDM repository or data representing differences in the data from the MDM repository) into the extended repository 191. In examples where data synchronization occurs asynchronously, it may not be possible to provide real-time synchronized data, which can compromise accuracy when performing search operations on the extended repository.

An authorization module 152 provides secure and authorized access to access information in both the custom repository and the MDM repository. In some examples, authorization can be based at least in part on the role of a respective user. The SAL exposes the security context through a Security Manager, which can be used on the extended repository 191 or the MDM repository 181.

When using MDM solution services, access to a data item is controlled by a role associated with an authorized user. Information on users and roles can be maintained by administrative services. Field-level authorization is ensured before displaying data to the user, so that secure data is exposed when authorized for a given role.

When using authorization features provided by a third-party tool (e.g., MDM vendor products such as IBM WPC), an application can use security context exposed by the third party tool. This context can be accessed using wrapper APIs that provide hooks to vendor-product specific APIs.

An Event Manager 160 is used for handling the events that initiate synchronization of data between the MDM product repository and the extended repository to provide search results with near- to real-time data. The Event Manager 160 can have registered listeners that subscribe to changes events associated with an entity attribute or an entity itself, for example, item attribute change or addition. Upon adding or updating an entity in the MDM repository 181, the change listener receives a notification and sends 163 a trigger to the Synchronizer module 155.

Product Adapter Interface (PAI) components 165 and 166 implement wrapper classes to allow access to the MDM repository 181 and the extended repository 191, respectively, using product APIs 167 and 168. For example, the MDM product API 167 (e.g., proprietary Java APIs) is used to access data and functions available in the MDM domain 180. The Product API 168 used to access the extended domain 190 is selected based on the configuration used to implement the extended domain. Thus, these product adapters 165 and 166 allow the MDM PAIP system 100 to bypass the regular user interface provided by the MDM product "out of the box," and allows transparent implementation of custom user interfaces.

A Flexible Domain Data Model (FDDM) 173 is offered as part of the solution provides a relational representation of the various entities and relationships that exist across industries in a MDM context. In some examples, the FDDM 173 includes customized hierarchical MDM Retail and/or Customer Package Goods (CPG) Data Models (e.g., providing roles, permissions, etc.). The FDDM 173 can also provide hierarchy management and category-specific attributes. The FDDM 173 can be used across both retail and CPG domains.

Example Data Elements and Classification Hierarchy

FIGS. 2A-2E illustrate data elements at several different stages of performing a method of developing an example data classification hierarchy that includes a number of data elements. Data elements represent a collection of similar objects in an MDM environment. For example, for an MDM PAIP system implemented for a retail merchandiser, three objects Polo, Shirt, and T-shirt could be objects associated with the data element "Tops."

A data classification hierarchy (e.g., an MDM data classification hierarchy) can be built by organizing data elements along parent-child relations. For example, in some hierarchies, one parent data element may have multiple children, and a child data element can belong to no more than one parent. In other examples, a child data element can have more than one parent. A data classification hierarchy will have two or more hierarchy levels. For example, an organization of data elements into a hierarchy, listed from higher to lower levels as follows: Segment, Department, Class, Sub-Class, and Style, can be used as a data classification hierarchy for a retail merchandise application. Data elements include hierarchy levels and dimensions.

As used herein, a "node" is an instance of a hierarchy level. For example, the following nodes belong to the hierarchy levels (in parentheses) in the retail merchandiser example above: Apparel (Segment), Men's Apparel (Department), Tops (Class), and T-shirts (Sub-Class), and Short Sleeve Round Neck T-shirts (Style).

As used herein, a "relation" defines one or more types of dependencies between data elements and/or nodes. A node can reference, or be referenced by, other nodes.

Nodes can also be assigned one or more node types. A child node is a node referencing an upper node in a relation. A parent node is a node referenced by a lower node in a relation. Other nodes types can be assigned. For example, a root node is a top node in a data classification hierarchy. A root node will not reference any other parent nodes. A leaf node is a bottom node in a hierarchy. A leaf node will not be referenced by any other child nodes.

Figure 2A:
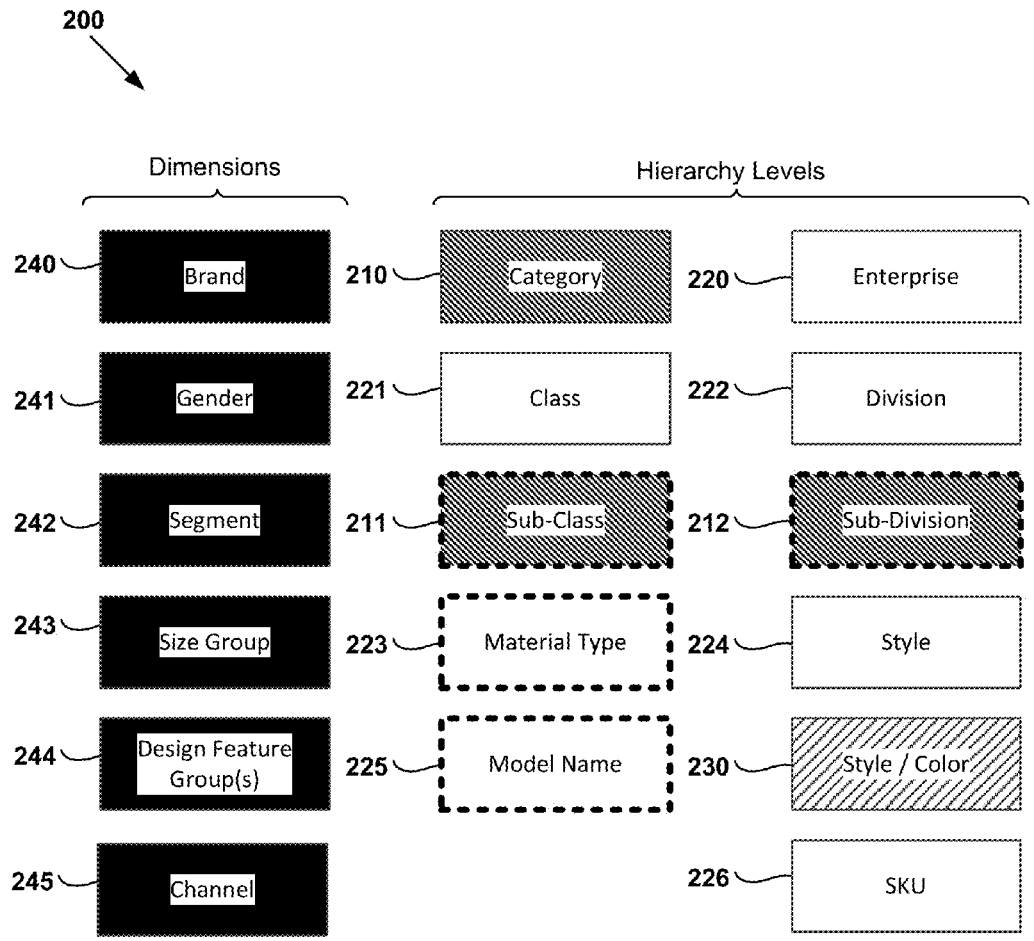
FIGS. 2A-2E illustrate data elements, relations, and nodes at several different stages of performing a method of developing an example data classification hierarchy.

FIG. 2A is a diagram 200 that illustrates a generalized example of a number of data elements that can be organized into data classification hierarchies as will be described in further detail below. The diagram 200 of FIG. 2A illustrates a number of hierarchy levels, including dimensional levels (e.g., dimensional levels 210-212), regular levels (e.g., regular levels 220-226), and a base level 230.

Base levels (e.g., base level node 230) are hierarchy levels acting as containers for data objects at a level of granularity typically used in transactions. In a sense, the other levels (e.g., regular levels 220-226 and dimensional levels 210-212) and dimensions in a classification hierarchy are created to better group, detail, and organize base levels. Base levels can be used to describe what objects are stored, sold, and forecasted. For example, in the apparel industry, forecasting, planning, and ordering is often done at a style/color level. Hence, nodes belonging to the style/color level will be designated as base nodes.

Dimensional levels (e.g., dimensional levels 210-212) are levels having nodes that are defined by combining values resulting from a set of "dimensions" referenced by the nodes. For example a dimensional node "Department" can be derived from a Segment dimension by adding a reference to a Gender dimension. If the Gender Dimension can be assigned to the following values: Mens, Womens, Childrens, then Department-level dimensional nodes Men's Apparel, Women's Apparel, and Childrens' Apparel can be derived by combining the Segment and Gender dimensions. As described further below, dimensions can be independent or dependent.

Regular levels (e.g., regular levels 220-226) are levels that are not generated through a combination of dimensions. Values for nodes assigned to regular levels can be individually generated and assigned.

FIG. 2A also illustrates a number of dimensions 240-245, which are a type of data element. As used herein, there are two types of dimensions, independent dimensions (e.g., independent dimensions 240-244) and dependent dimensions. Independent dimensions have values that are independent of node values for a respective node. For the retail merchandiser example, Gender is an example of an independent dimension, because values for the dimension can be applied to nodes regardless of the node's associated value.

Dependent dimensions are dimensions that have values dependent on an upper node value. For example, a level Sub-Class that has values that depend on an upper level (e.g., a Class-Level Node) can be defined using dimensions. The allowable values for dependent dimensions can vary based on the department or class node values. For example, the dependent dimension "Neck Shape" may not be relevant for Dress Shirts, but be relevant for T-Shirt. Similarly, the dimension "Collar Shape" may be relevant only to Dress Shirts. In some cases, a dimension may be relevant to multiple hierarchy levels, but the actual allowable (valid) values may differ.

Example Method of Data Classification Hierarchy Development

FIGS. 3-7 illustrate a number of techniques that can be used to generate MDM data classification hierarchies, including methods for generating data elements, including hierarchy levels and dimensions, defining relations between data elements, defining dimensional levels, and generating nodes and valid values for data classification hierarchies. As will be readily understood to one of ordinary skill in the art, the disclosed techniques can be used together or separately, and can be used, for example, to manipulate the exemplary data classification hierarchies illustrated in FIGS. 2A-2E. Further, FIGS. 8A-8D illustrate example GUIs that can be used with the exemplary methods.

Example Method of Generating Data Elements

FIG. 3 is a flow chart 300 that outlines an exemplary method of receiving a classification hierarchy, generating dimensional levels and associated nodes, and generating master data classifications based on the classification hierarchy and associated nodes, as can be used in certain embodiments of the disclosed technology. Master data classifications can be used to classify master data in an MDM system based on multiple criteria (e.g., multiple classifications, such as by an organization responsible for a product line or according to a standard industry classification). Master data classification can be mapped to external master data (e.g., master data generated by business partners, competitors, or acquired MDM systems).

At process block 310, a classification hierarchy is received defining one or more dimensions and one or more relations between a set of hierarchy levels. Each of the hierarchy levels represents a collection of related objects in an MDM environment, for example, objects stored in an MDM repository, as discussed above regarding FIG. 1. Each of the dimensions represents allowable values that can be assigned to nodes in the classification hierarchy. For example, a hierarchy level that is associated with a Brand dimension might have allowable node values of "Chanel," "Nike," and "Gucci." The relations can include references between hierarchy levels, to establish parent/child relations. The classification hierarchy can define hierarchy levels as being higher or lower in the hierarchy based on the relations, based on a hierarchy level being designated as a root level, or based on one or more hierarchy levels being designated as leaf levels.

In some examples, the classification hierarchy received at process block 310 is defined by a user using, for example, a GUI interface. In some examples, the classification hierarchy is previously defined or stored as data in an extended repository. As discussed above regarding FIG. 2A, the classification hierarchy can include a number of different types of hierarchy levels, including regular levels, base levels, and dimensional levels. The classification hierarchy can also include a number of independent and/or dependent dimensions.

At process block 320, one or more dimensional levels are generated by associating a dimension with one or more of the hierarchy levels. The dimension can be independent or dependent, and defines a set of allowable values for nodes associated with the dimensional level. For the retail merchandiser example, a dimensional level associated with a Brand and Gender dimension could have nodes with valid levels of "Mens Chanel," "Mens Nike," "Mens Gucci," "Womens Chanel," "Womens Nike," and "Womens Gucci." Thus, dimensional levels are distinguished from regular hierarchy levels in that allowable values for nodes associated with the dimensional levels can be generated based on the associated dimensions, and therefore do not require additional input to define the dimensional level.

At process block 330, one or more nodes are associated with the dimensional levels generated at process block 320. For example, the six valid values mentioned above for the dimensional level associated with a Brand and Gender dimension could be assigned as the valid values for the dimensional level. Thus, allowable values for the associated nodes can be determined based on allowable values for a particular dimension.

At process block 340, master data classifications are generated for the MDM environment based on the classification hierarchy and the associated nodes. Because the associated nodes are based on dimensional levels, the master data classifications include objects having allowable values that are based on the associated nodes and respective dimensions. For example, data records and data structured stored in an MDM environment can be assigned valid values based on the valid values for a dimensional level associated at process blocks 320 and 330, above.

Figure 4:
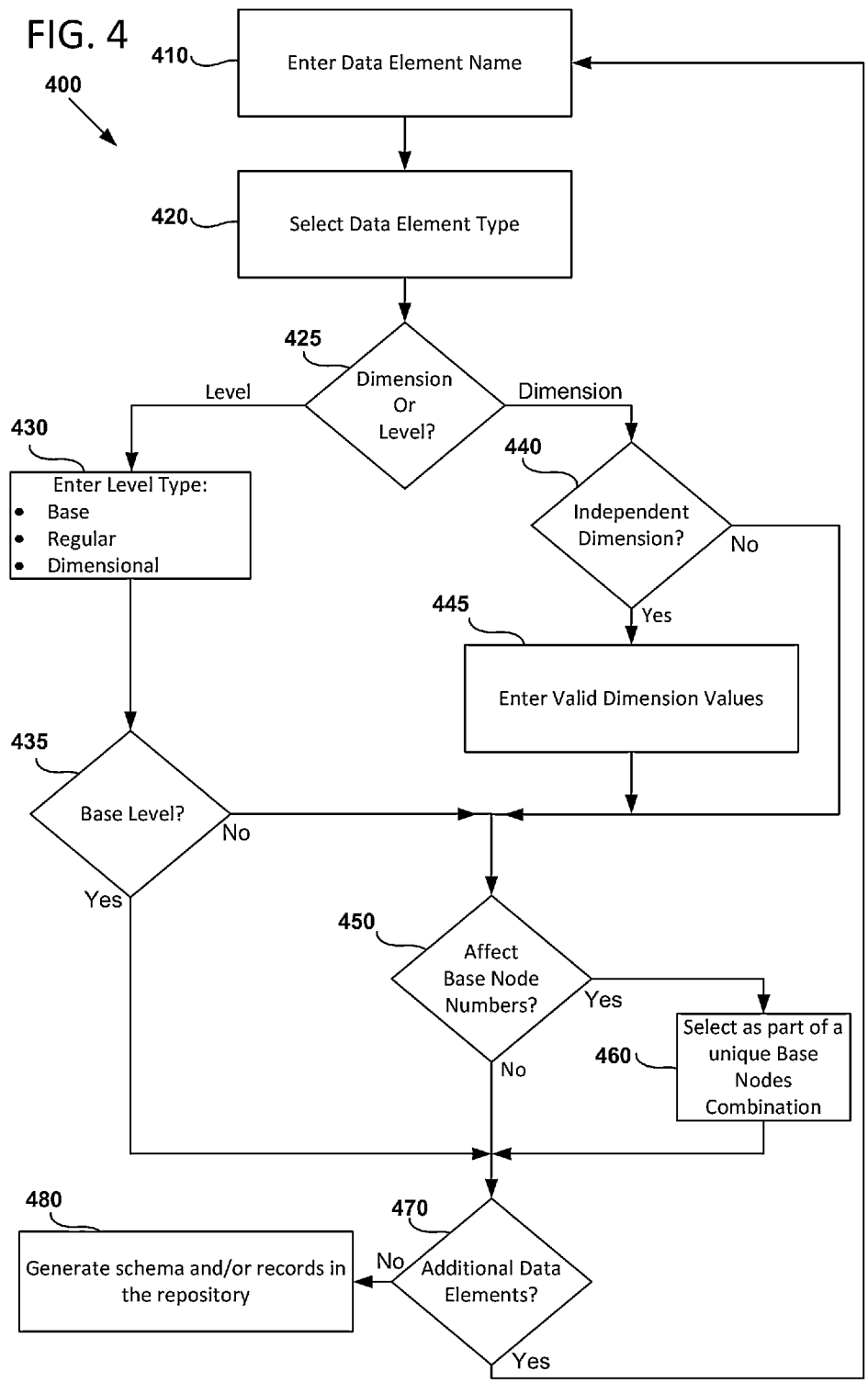
FIG. 4 is a flow chart that illustrates a generalized example of a method of generating data elements for a master data classification hierarchy.
Figure 8A:
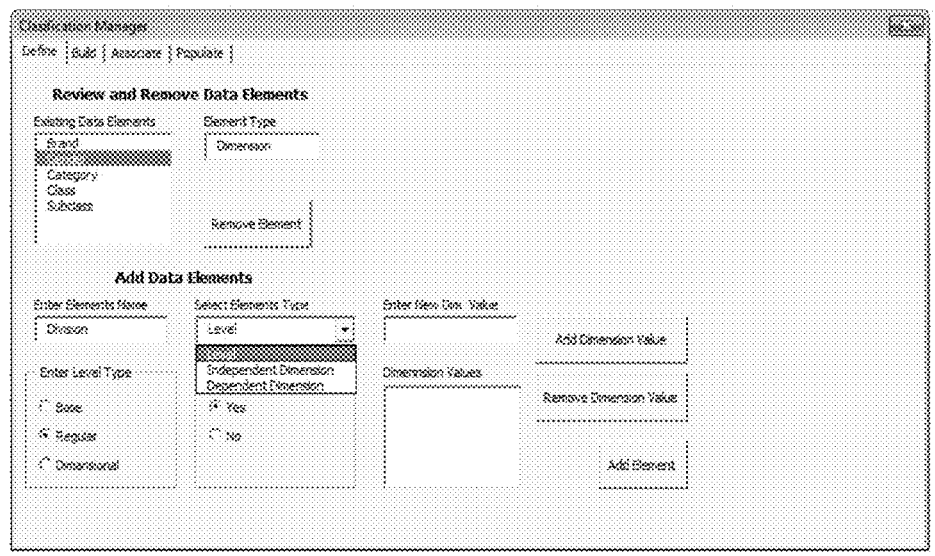
FIGS. 8A-8D illustrate GUI windows that can be used with certain methods for developing a master data classification hierarchy for an MDM environment.

In some examples, the master data classifications are generated as schemas for one or more MDM environments. In some examples, the master data classifications are generated as database records in the MDM environments. It should be noted that multiple master data classifications can be generated for multiple MDM environments based on a single classification hierarchy and associated nodes. Thus, the classification hierarchy acts as a golden hierarchy that can be used to generate classifications across multiple different MDM environments, which might come from different MDM vendors, and include a variety of hardware, software, and capabilities. Further, different MDM data classifications can be generated for each MDM environment, thereby allowing automatic tailoring of MDM classification data based on a single classification hierarchy Example Method of Defining Hierarchy Levels and Dimensions FIG. 4 is a flow chart 400 of another, more detailed, exemplary method of generating hierarchy levels and dimensions for a classification hierarchy as can be used in certain embodiments of the disclosed technology. An exemplary GUI form 800 suitable for entering and selecting data as shown in the flow chart 400 is depicted in FIG. 8A.

At process block 410, a data element name is entered, using, for example, a string field in a GUI form. The data element name can be arbitrary, and does not necessarily need to match object names used in the corresponding MDM environments. As shown in FIG. 8A, a data element name "Division" has been entered.

At process block 420, a data element type is selected using, for example, a GUI form. As shown, a data element can be selected to be a level, and independent dimension, or a dependent dimension. As shown in FIG. 8A, a data element type "Level" has been selected. At process block 425, a determination is made whether a level or a dimension (e.g., a dependent or independent dimension) as selected. If a level was selected, the method proceeds to process block 430, otherwise, the method proceeds to process block 440.

The method proceeds to process block 430, where data is received selecting a hierarchy level type. For example, as shown in FIG. 8A, a hierarchy level type "Regular" is selected using radio buttons in a GUI. Other level types that can be selected include base levels and dimensional levels. At process block 435, the method determines whether a base level is selected and if so, proceeds to process block 470. If the level selected at process block 430 was not a base level, the method proceeds to process block 450.

The method proceeds to process block 440, if a dimension data type was selected at process block 420, where it determines whether the dimension is an independent dimension or dependent dimension. If the selected dimension is an independent dimension, the method proceeds to process block 445. Otherwise, the method proceeds to process block 450.

At process block 445, additional input is received to enter a number of valid values for the selected independent dimensions. For example, as shown in FIG. 8A, a user adds a new value for the selected dimension by typing the value into a GUI form. A user can also remove dimension values by selecting an existing independent dimension value and selecting a button. After receiving one or more valid dimension values for the independent dimension, the method proceeds to process block 450.

At process block 450, the method determines whether the newly added data element (e.g., a non-base level hierarchy level, an independent dimension, or a dependent dimension) will affect the nodes of a base node. Non-base levels can be identified as part of a unique combination defining the base level nodes. For example, if the newly added data element is a parent level of a base level that is used to create a new combination of values for base level nodes, then the newly added data element is determined to impact the base node numbers. For example, as shown in FIG. 8A, a user can select "Yes" in the GUI form to indicate that the new data element will affect base node numbers. If the new data element will affect base node numbers, the method proceeds to process block 460. If the new data element will not affect base node numbers, the method proceeds to process block 470.

At process block 460, a level or dimension is designated as part of a unique base nodes combination for a base level. When data elements or associated nodes designated as part of a unique based nodes combination are changed, this indicates that one or more associated base nodes are to be changed as well. For the retail merchandiser example, if a new model name is assigned for a style/color code, then a change in the model name (part of a particular unique based nodes combination) implies that the style/color code should be changed as well.

At process block 470, the method checks to determine whether additional data elements are to be added to the classification hierarchy. For example, a user can select the "Add Element" button in the GUI form 800 shown in FIG. 8A to indicate that additional elements are to be added. If additional data elements are to be added, the method proceeds back to process block 410, otherwise, the method proceeds to process block 480.

At process block 480, entering of data elements is completed. For example, the GUI form 800 shown in FIG. 8A can be closed, and the MDM PAIP system can generate and store schema and/or other records for the classification hierarchy (e.g., the defined levels, dimensions, and values that were generated and/or selected) in an extended repository.

Some of the data elements that can be defined using the method outlined in the flow chart 400 is shown in FIG. 2A. As shown, a number of dimensions (e.g., Brand dimension 240 and Gender dimension 241) and hierarchy levels (e.g., regular level Enterprise 220, base level Style/Color 230, and dimensional level Sub-Class 211) have been defined. In some examples, data elements can be shown on a computer display as they are created. For example, the name of the data elements can be displayed on shapes that are color-coded or shaded to indicate the type of the data element.

It should be noted that the GUI form windows 800, 810, 820, and 830 shown in FIGS. 8A-8D do not necessarily require execution of associated operations in a particular sequence. For example, after generating new data elements using the form shown in FIG. 8A, a user can select the "Build" tab and build hierarchy level relations, as discussed regarding FIG. 8B, then select the "Associate" tab to generate associations between levels, as discussed below regarding FIG. 8C, and then return back to the form shown in FIG. 8A to add additional data elements. Thus, the user can iteratively build a classification hierarchy.

Example Method of Defining Relations in a Data Classification Hierarchy

Figure 5:
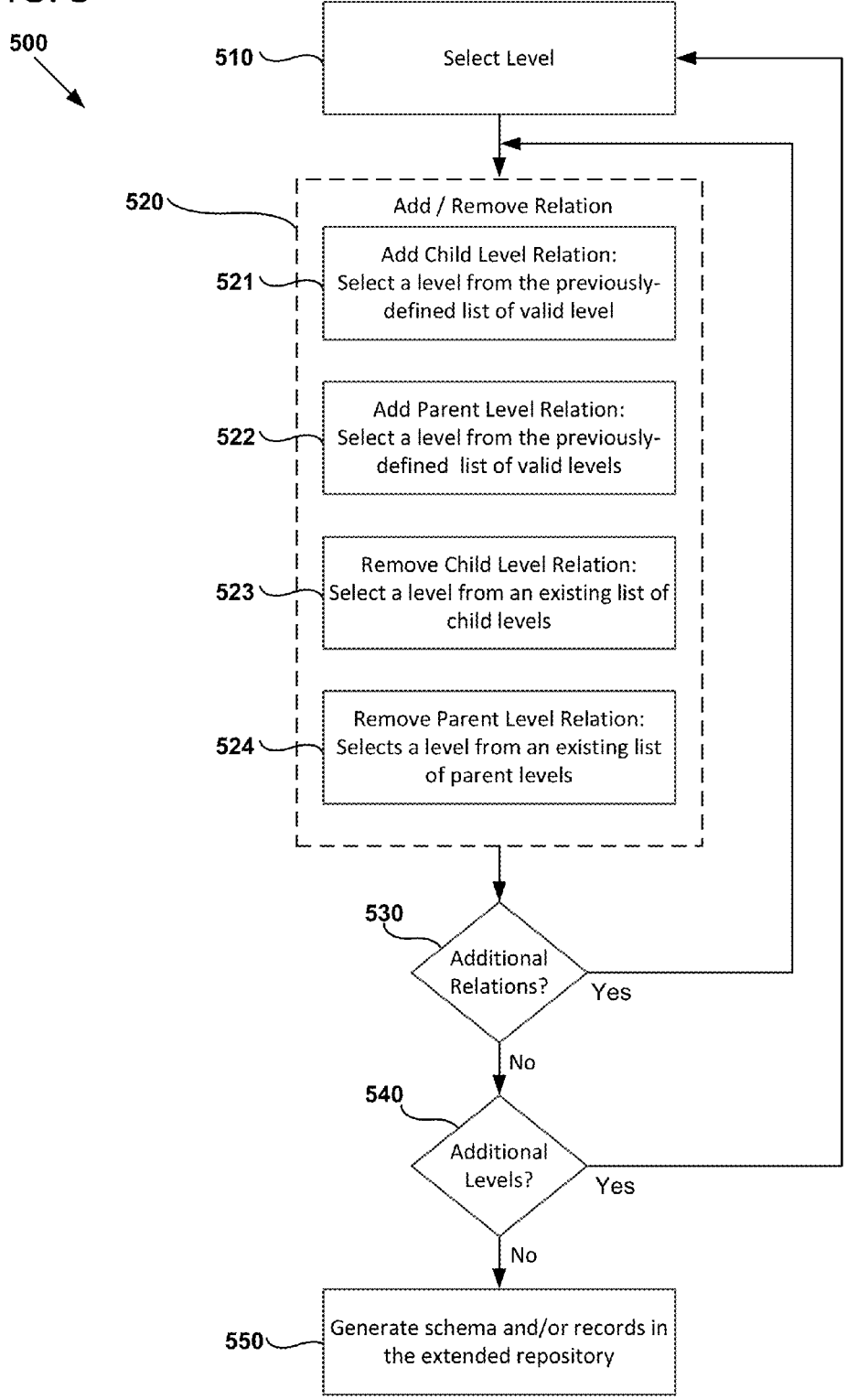
FIG. 5 is a flow chart that illustrates a generalized example of a method of generating relations for data elements for a master data classification hierarchy.

FIG. 5 is a flow chart 500 that outlines an exemplary method of defining hierarchical relations between two or more levels of the classification hierarchy as can be used in certain embodiments of the disclosed technology.

Figure 8B:
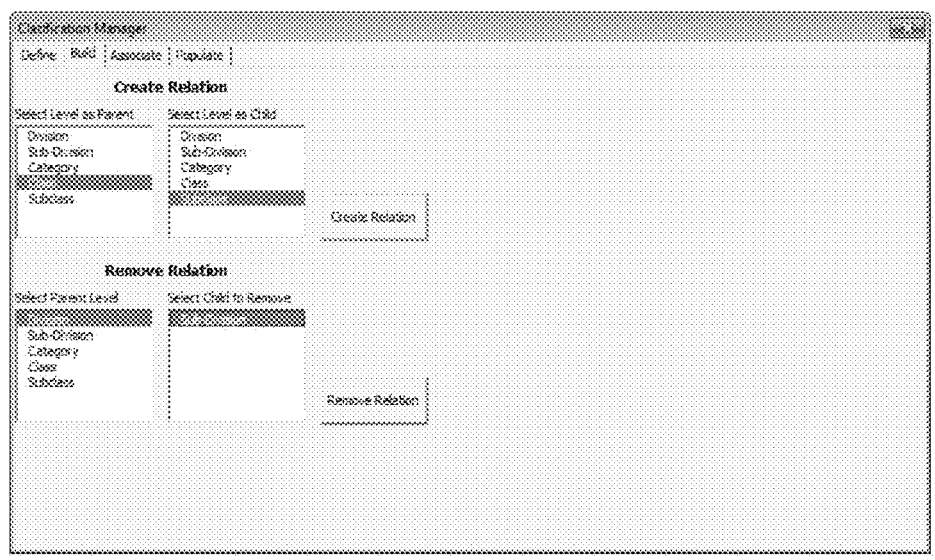

For example, by using the GUI form 820 depicted in FIG. 8B, a user can select any of the previously defined hierarchy levels (e.g., hierarchy levels defined using the method described above regarding FIG. 4) and then establish or eliminate a relation to a different level. A user can initiate the GUI form by, for example, selecting the "Build" tab as shown in FIGS. 8A-8D.

At process block 510, a previously-defined hierarchy level is selected using, for example, a GUI screen to select from a list of hierarchy levels. After selecting a hierarchy level, the method proceeds to process block 520.

At process block 520, a relation between the selected hierarchy level and another hierarchy level defined in the classification hierarchy can be created or removed. For example, a user can select levels to add or remove as child or parent relations by using the GUI form 810 shown in FIG. 8B. As shown, unrelated levels in a list of valid levels can be selected for adding, while levels that have an existing child or parent relationship with the selected hierarchy level can be selected for removal. Depending on the relationship action selected, the method proceeds to one of the appropriate sub-process blocks 521-524 to create or remove the selected child or parent relationship.

At process block 530, the method checks to determine whether additional relations are to be created for the selected hierarchy level. For example, the user can select additional relations to add or remove for the selected hierarchy level using a GUI form as shown in FIG. 8B. If additional relations are to be created, the method proceeds to process block 520. If no additional relations are to be created for the selected level, the method proceeds to process block 540.

At process block 540, the method checks to determine whether relations are to be added for additional levels of the classification hierarchy. For example, a user can select another level using a GUI form. If additional relations are to be added, the method proceeds to process block 510. If no additional relations are to be added, the method proceeds to process block 550.

At process block 550, generation of relations is completed. For example, the GUI form 810 shown in FIG. 8B can be closed, and the MDM PAIP system can generate and store schema and/or other records for the relations defined for the classification hierarchy as entries in an extended repository.

Figure 2B:
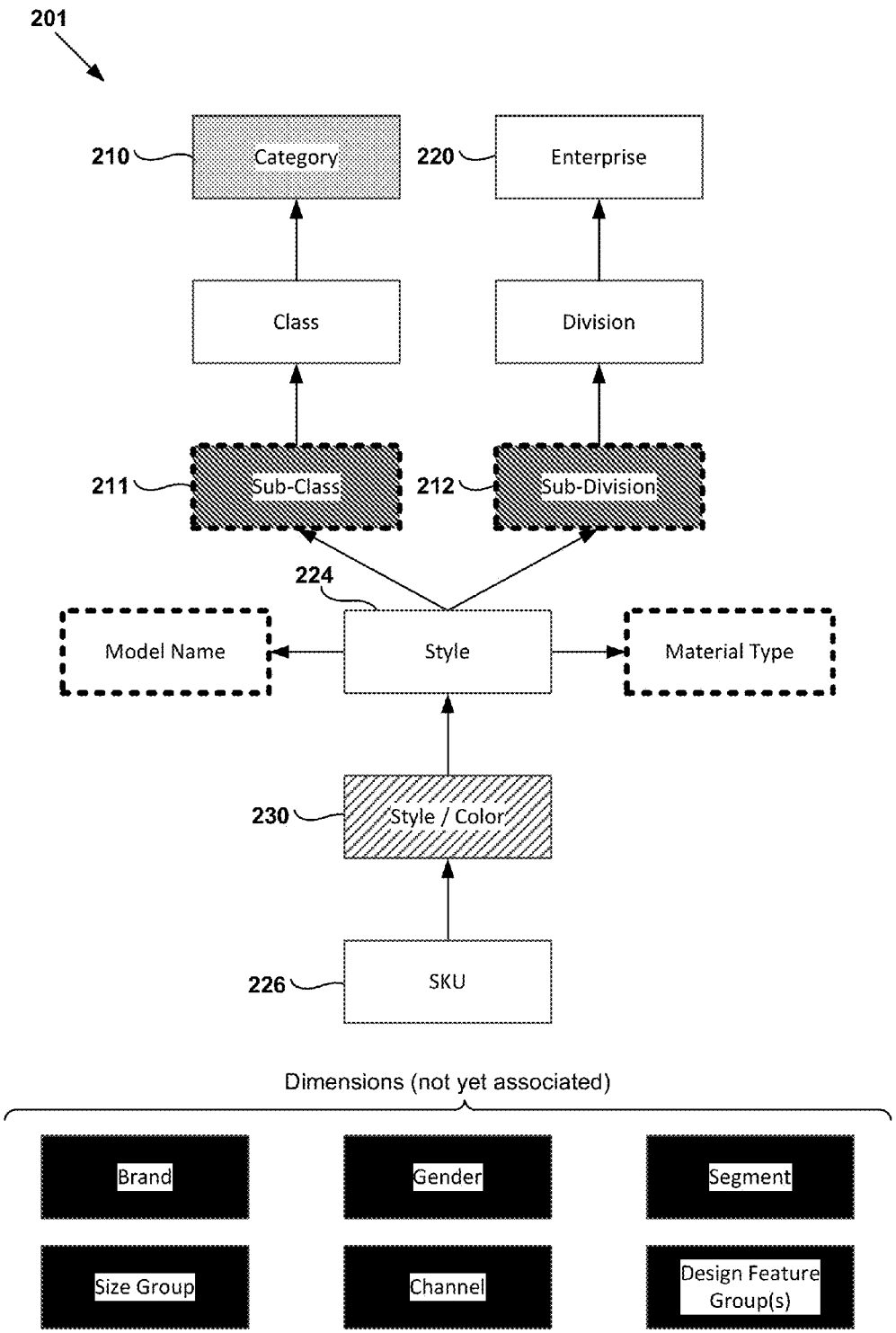

A set of example relations that have been defined using the method outlined in the flow chart 500 is shown in the class hierarchy illustrated in diagram 201 of FIG. 2B. As shown, a number of relations have been defined between hierarchy levels. For example the Style level 224 has two parent levels, Sub-Class 211 and Sub-Division 212, and one child base level, Style/Color 230. In some examples, relations and their associated data elements can be shown on a computer display as they are created. The class hierarchy further includes one leaf level named SKU 226 and two root levels, named Category 210 and Enterprise 220. Thus, the class hierarchy includes two alternative hierarchies. Whether to use a particular root level as the top of a hierarchy (or, alternatively, more than one root level) can be determined by the role of an MDM user. For example, a user operating in a bricks-and-mortar role might use the first hierarchy having a root level Category 210, while a user operating in an E-commerce role might use the second hierarchy having a root level Enterprise 220.

Example Method of Associating Dimensions in a Data Classification Hierarchy

Figure 6:
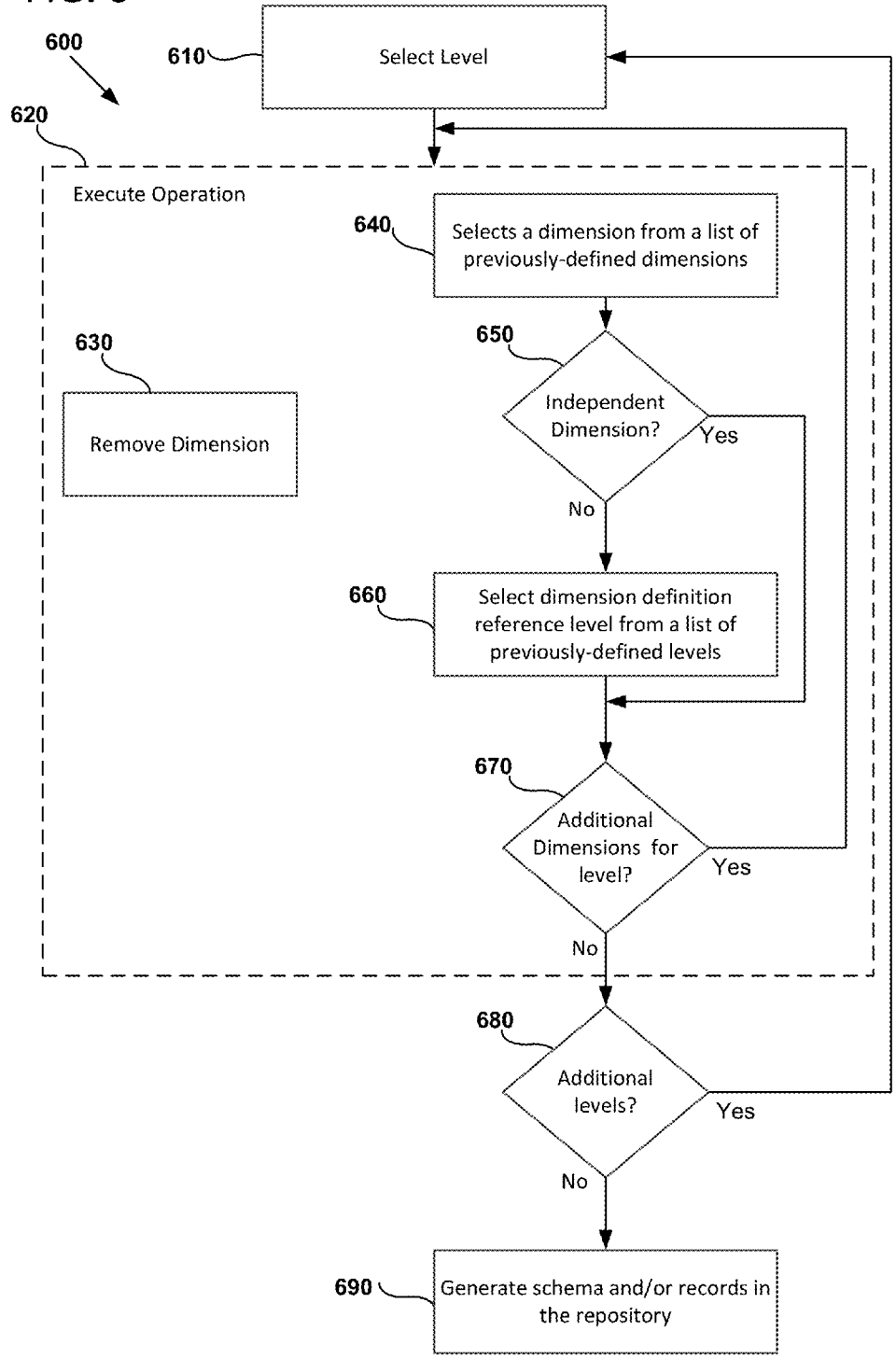
FIG. 6 is a flow chart that illustrates a generalized example of a method of generating independent and dependent dimensions for a master data classification hierarchy.

FIG. 6 is a flow chart 600 that outlines an exemplary method of associating dimensions with hierarchy levels as can be used in certain embodiments of the disclosed technology.

Figure 8C:
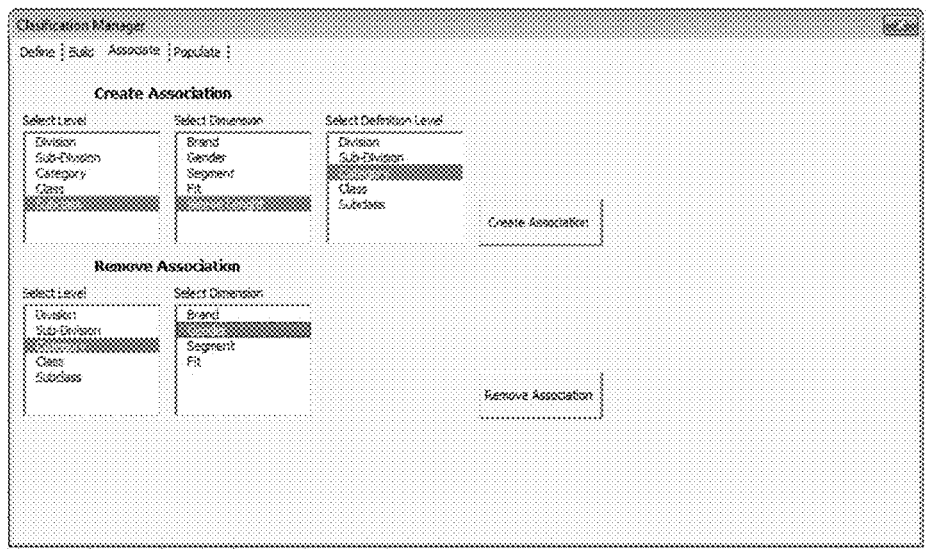

For example, by using the GUI form 820 depicted in FIG. 8C, a user can select any of the previously defined hierarchy levels (e.g., hierarchy levels defined using the method described above regarding FIG. 4) and then establish or eliminate relations to independent or dependent dimensions. A user can initiate the GUI form 820 by, for example, selecting the "Associate" tab shown in FIGS. 8A-8D.

At process block 610, a hierarchy level is selected using, for example, a GUI screen to select from a list of hierarchy levels. In some examples, hierarchy levels are designated as dimensional levels when the respective level is created. In other examples, hierarchy levels can be designated as dimensional levels by associating a dimension with the level below at process block 620. After selecting a hierarchy level, the method proceeds to process block 620.

At process block 620, an association between the selected dimensional level (or alternatively, a regular hierarchy level that is changed to a dimensional level based on creating an association) and a dimension in the classification hierarchy can be created or an existing association can be removed. By associating a dimension to a dimensional level, a user informs the MDM PAIP system that nodes belonging to the selected hierarchy level should be defined by the associated dimension values. Hence, valid values for a level can be generated based on the dimension, instead of being designated or entered manually.

For example, a user can create or remove dimension associations using the GUI form 820 shown in FIG. 8C. As shown, a level (Subclass) and dimension (Sleeve Length) are selected. If the action of removing a dimension is selected, the method proceeds to sub-process block 630, and the association between the selected dimension and hierarchy level is removed from the class hierarchy. If the action of adding a dimension is selected, the method proceeds to sub-process block 640.

At sub-process block 640, a dimension is selected from a list of dimensions that have been previously defined (for example, by creating data elements as discussed above regarding FIG. 4). The dimension can be selected by using a GUI form, or by selecting a representation of the dimension on a computer display of the class hierarchy. After selecting a dimension, the method proceeds to sub-process block 650.

At sub-process block 650, the method determines whether the selected dimension is an independent or dependent dimension. If the selected dimension is dependent, the method proceeds to sub-process block 660, otherwise, the method proceeds to sub-process block 670.

At sub-process block 660, a reference level for the selected dependent dimension can be selected. For example, the reference hierarchy level can be selected from the "Select Definition Level" list shown in the GUI form 820 of FIG. 8C. The purpose of selecting a reference level for the dependent dimension is to establish distinct dimension values for groups of nodes having the same parent node. For example, subclasses derived from different respective parent nodes can have different associated dimensions. After selecting a reference level, the method proceeds to sub-process block 670.

At sub-process block 670, the method determines whether there are additional dimensions to be associated with the selected hierarchy level. If so, the method proceeds to process block 620, and additional dimensions can be selected at sub-process block 640 or dimensions can be removed at sub-process block 630. Otherwise, the method proceeds to process block 680.

At process block 680, the method determines whether there are additional hierarchy levels to be associated with dimensions. If there are additional levels, the method proceeds to process block 610 so that additional levels can be selected. Otherwise, the method proceeds to process block 690.

At process block 690, association of dimensions is completed. For example, the GUI form 820 shown in FIG. 8C can be closed, and the MDM PAIP system can generate and store schema and/or other records for the relations defined for the classification hierarchy as entries in an extended repository. Further, the user can later return to the GUI form 820 shown in FIG. 8C to add associate additional dimensions.

Figure 2C:
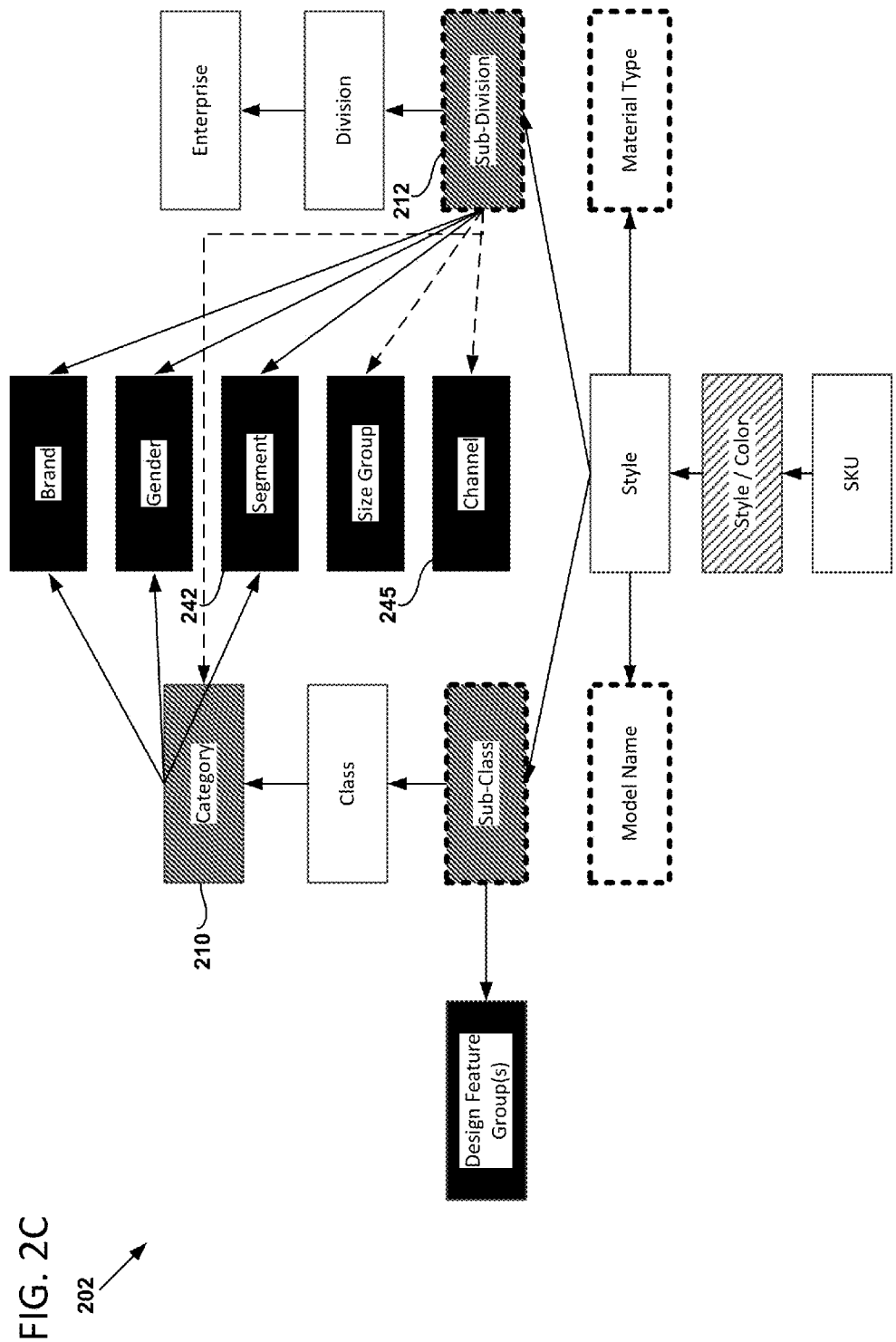

A set of example associations that have been defined between dimensions and hierarchy levels using the method outlined in the flow chart 600 is shown in the class hierarchy illustrated in diagram 202 of FIG. 2C. As shown, a number of dimensions are now associated with hierarchy levels. For example, relations are created such that the Segment dimension 242 is associated with the Category dimensional level 210 and the Sub-Division dimensional level 212. Thus, values for nodes of the dimensional levels can be defined using the associated dimensions. Also indicated by the dashed arrows are optional associations. For example, the dimension Channel 245 has an optional association with the Sub-Division level 212. Assignment of values to nodes from the optional associated dimension is optional, so that nodes associated with a level (e.g., nodes associated with Sub-Division level 212) do not need to have a value assigned for the associated dimension.

Example Method of Populating Nodes in a Data Classification Hierarchy

FIG. 7 is a flow chart 700 that outlines an exemplary method of populating nodes in a data classification as can be used in certain embodiments of the disclosed technology. This includes assigning and/or defining nodes belonging to hierarchy levels, as well as defining valid values for dependent dimension. Populating nodes starting with root-level nodes of the hierarchy facilitates the creation of lower-level nodes, which can be related to previously-defined nodes at higher levels of the class hierarchy.

Figure 8D:
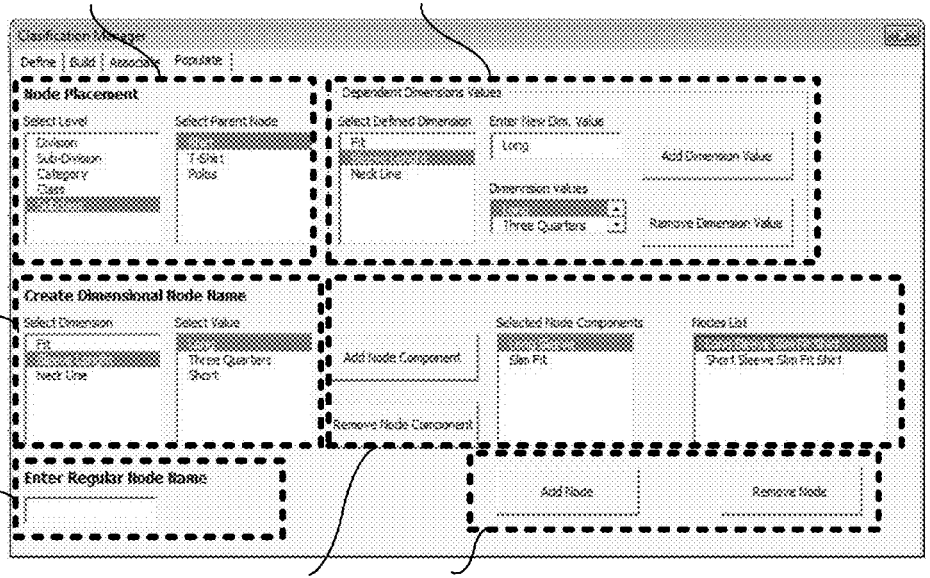

For example, by using the GUI form 830 depicted in FIG. 8D, a user can select levels and/or parent nodes for a node, select dimension values for a previously-defined dependent dimension, and/or add node components and nodes to the class hierarchy. A user can initiate the GUI form 830 by, for example, selecting the "Populate" tab shown in FIGS. 8A-8D.

At process block 710, a hierarchy level for a node to be populated is selected using, for example, a GUI screen to select from a list of hierarchy levels. For example, FIG. 8D illustrates a set of GUI controls 831 that allows a user to identify the level for the new node by selecting a previously defined level. After selecting a level for the node, the method proceeds to process block 720.

At process block 720, the method determines whether the selected hierarchy level for the selected node is a root level. If a root level was selected, the method proceeds to process block 730, otherwise the method proceeds to process block 725.

At process block 725, a reference node in a parent level of the selected non-root node is selected. The reference node can be selected using, for example, a GUI form 830 to select from a list of parent nodes. For example, a user can select a level and reference nodes using a control 831 including a list of levels and parent nodes, as shown in FIG. 8D. Subclasses derived from different respective parent nodes can have different associated dimensions. For example, subclasses derived from a parent node "Shirt" will have different dimensions than subclasses derived from a parent node "Polos."

At process block 730, the method determines whether a dimensional or regular level has been selected. If the selected level is a regular level, the method proceeds to process block 740 to be defined individually based on, for example, user input. If the selected level is a dimensional level, then the method proceeds to process block 750 to be defined based on a previously-selected set of dimensional values. Base levels can be processed as regular levels (e.g., and be defined individually by proceeding to process block 740) or dimensional levels (e.g., and be defined by selecting from a set of values by proceeding to process block 750).

At process block 740, a name for the selected (regular) node is entered. This name will be added to the list of valid values for the reference level associated with the selected node. For example, a user can directly enter a new node name using an entry field 832 in a GUI form 830.

At process block 750, a number of nodes are generated be selecting valid combinations of dimensions associated with a hierarchy level. For example, a user can select a dimension (e.g., a sleeve length dimension) and a valid value (e.g., long sleeve) by selecting from a list interface element 833 in a GUI window 830. Hence, values to be associated with a dimension can be selected based on previously defined valid values for the dimension. Thus, for dimensional levels, the node values will be based on a combination of different values associated with one or more dimensions. This allows a user to select specific dimension values for the new node. These dimension values can be saved even if they are not used in the final node name. Not all possible combinations or dimensions associated with a hierarchy level have to be used as valid levels for a given node. Once valid combinations have been selected, and node can be added using a control 836 as shown in FIG. 8D.

At process block 760, the method determines whether a reference level is to be added to the dimension definition. If a reference level is to be added to the dimension definition, the method proceeds to process block 770. Otherwise, the method proceeds to process block 780.

At process block 770, a number of valid dependent dimension values can be entered for the selected node. For example, a user can select a defined dependent dimension, and enter or remove new dimension values for the dimension using controls 834 of a GUI window 830. For example, the defined dimension "sleeve length" can apply to multiple nodes, but may have different sets of values for nodes having the parent node "shirt" vs. nodes having the parent node "Polos."

For dependent dimensions, defining dimension to definition-level relation is for guidance. The actual relation is defined at the node level. Similarly, even when the same dimension is associated to multiple definition nodes, it can include different values based on the node. After adding or removing dependent dimension values, the method proceeds to process block 775.

At process block 775, the method determines whether additional node values are to be added, and if so, returns to process block 770. Otherwise, the method proceeds to process block 780.

At process block 780, a name for the new node is created. For example, the new name can be created as a combination of upper node and selected dimension values. In some examples, a user can select values to be used for a name using GUI controls 835 of a GUI form 830. A user can select node components for a name, or select previously defined node names from a nodes list. If a user determines a name that is unique or a name is becoming too long, at least some of the values for the name combination can be ignored or overridden. In this case, other node, value, and level associations are still stored for reference.

At process block 785, the method determines whether additional nodes are to be added, using for example, input received using a GUI form 830. If additional nodes are to be added, the method proceeds to process block 730. Otherwise, the method proceeds to process block 790.

At process block 790, generation of valid node values is completed. For example, the GUI screen shown in FIG. 8D can be closed, and the MDM PAIP system can generate and store schema and/or other records for the node values defined for the classification hierarchy as entries in an extended repository.

Figure 2D:
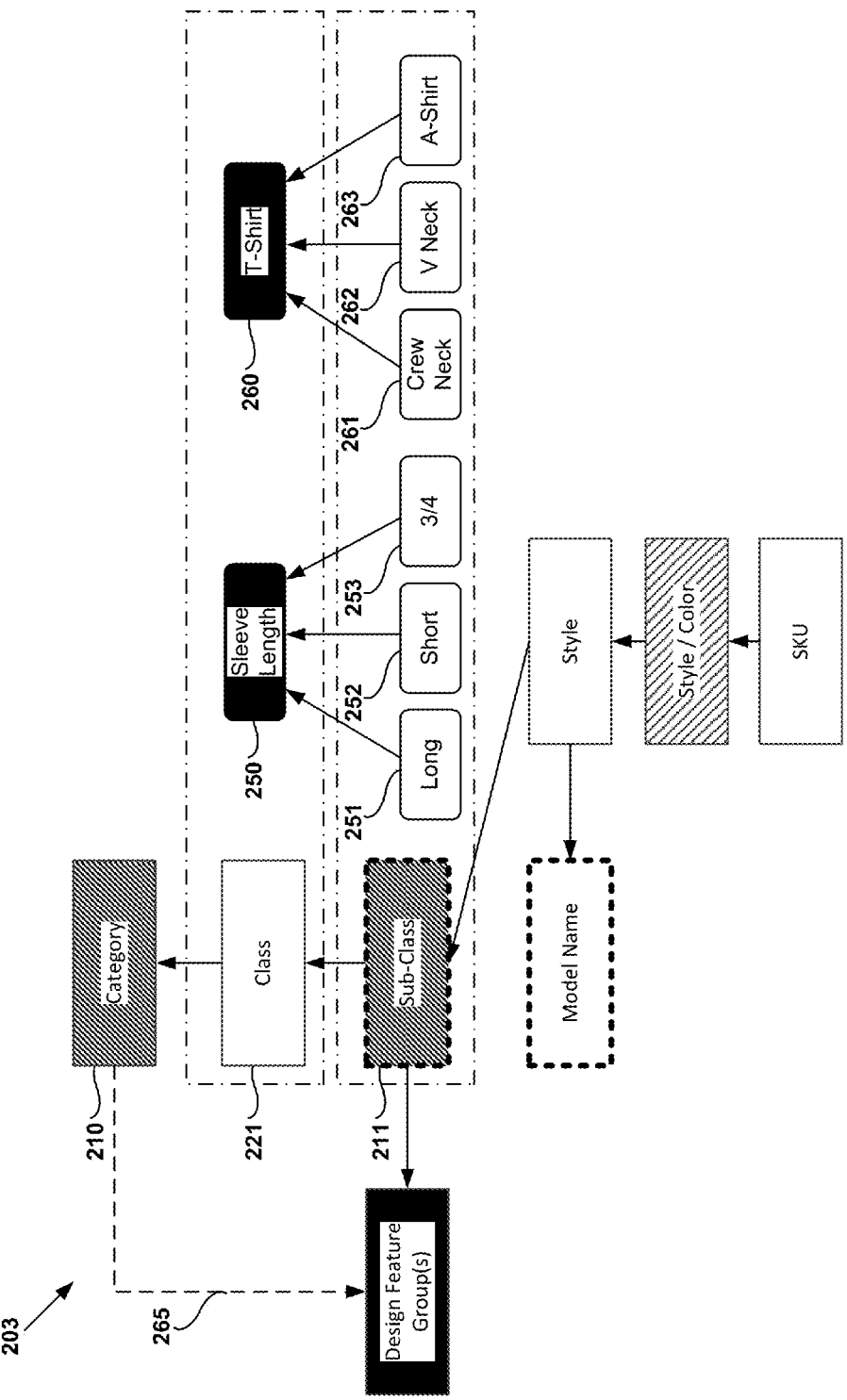

A set of example dependent dimension values that have been defined using the method outlined in the flow chart 700 is shown in the class hierarchy illustrated in diagram 203 of FIG. 2D. Some hierarchy levels and dimensions that were shown in FIG. 2C are not shown for clarity. As shown, a number of valid node values are now associated with a number of hierarchy levels. For example, the dependent dimension "Sleeve Length" 250 is associated with the Class hierarchy level 221 and has valid node values Short 251, Long 252, and ¾ 253, which are associated with the Sub-Class hierarchy level 211. Specific values of the dependent dimension Sleeve Length 250 vary based on the Class Node selected. Similarly, the dependent dimension "T-shirt" 260 is associated with the Class hierarchy level and has valid node values Crew Neck 261, V Neck 262, and A-Shirt 263. Values associated with the independent dimensions are based on the associated dependent dimension and are not assigned as with the dependent dimensions.

Also shown in FIG. 2D is an arrow 265, which indicates that the dimension "Design Features Groups" is defined at the category level. Thus, different values associated with Design Features Groups can be applied to different Categories.

Figure 2E:
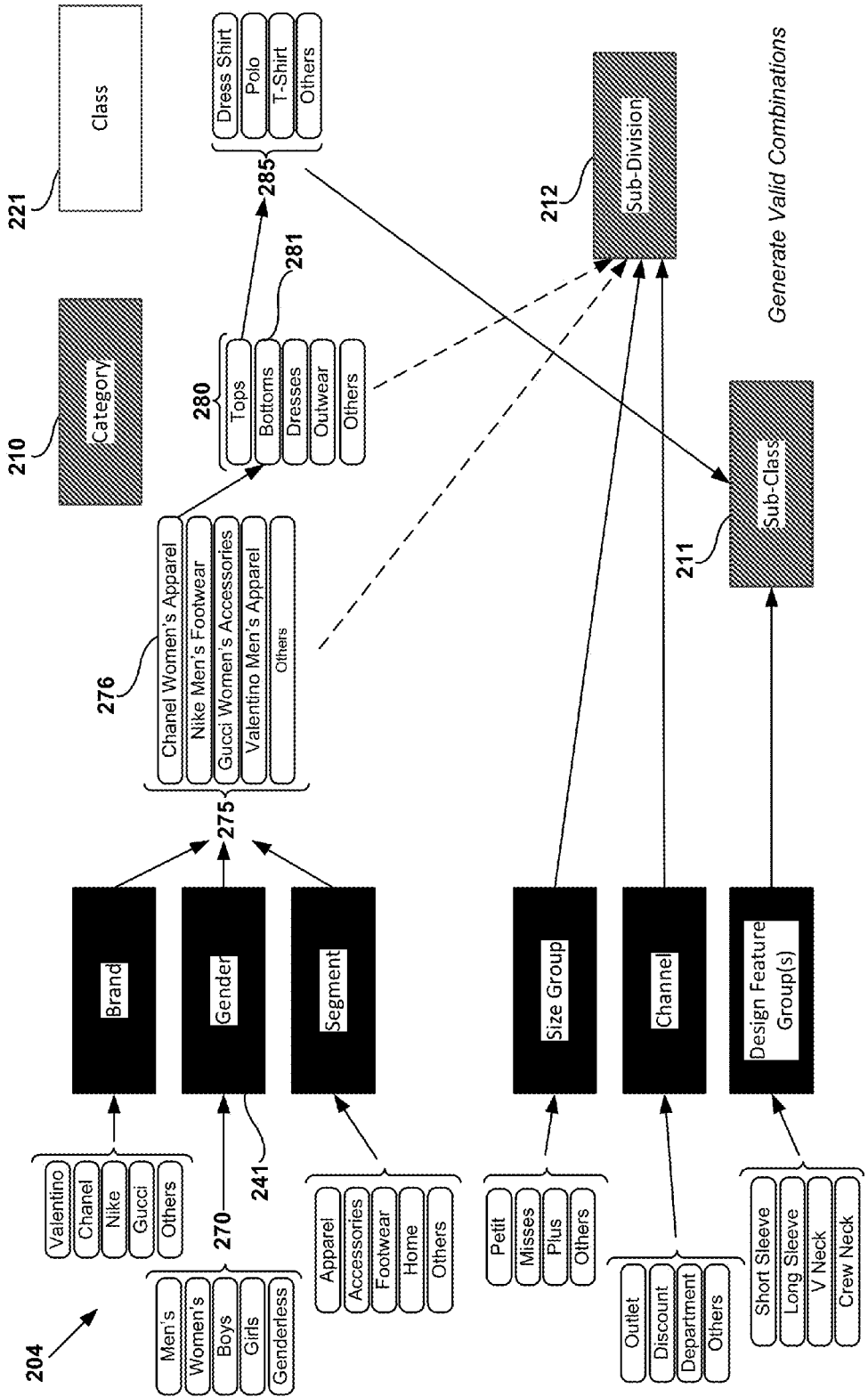

A set of valid independent dimension values and valid combinations that are generated using the method outlined in the flow chart 700 is depicted in the diagram 204 of FIG. 2E. As shown, a number of values have been generated for each independent dimension (e.g., valid values 270 Men's, Women's, Boys, Girls, and Genderless for the independent dimension Gender 241) using the techniques described above regarding process block 740. A number of valid combinations 275 of the valid values 270 have also been generated (e.g., the combination of values of Chanel, Women's, and Apparel from the independent dimensions Brand, Gender, and Segment, respectively, have been designated as a valid combinations). These combinations 275 can be generated using the techniques described above regarding process block 750.

It should be noted that the method of designating valid values and combinations described regarding the flow chart 700 can be an iterative process. For example, after generating the valid combinations 275, additional valid dimension values can be specified. As shown in FIG. 2E, a set 280 of valid values have been generated for nodes in the hierarchy level Category 210. Further, the valid value "Bottoms" 281 is depicted as assigned to the valid combination "Chanel Women's Apparel" 276. The Category value Tops has been defined to have a number of valid values 285 in the Class category 221. Next, additional valid combinations of the additional values 280 and 285 can be designated as valid combinations for the Sub-Division 212 and Sub-Class 211 hierarchy levels, respectively. These are possible node names, or nodes values from source or destination systems. As an example, an analysis tool reads attribute names for a third party data extract and allows mapping to the newly-defined structure. Similarly, actual field values can be mapped to the predefined dimension value set.

Thus, an interactive and iterative method of defining a class hierarchy for an MDM PAIP environment is disclosed. The disclosed methods encourage the use of dimensional levels, which can in turn encourages MDM users to develop more standardized hierarchies that can be used in varying business roles in an MDM system. The resulting class hierarchy can be used in a number of ways to define and use data in one or more MDM environments, and several examples are provided below.

Example Method of Generating Data Feed/Master Data Mappings

FIG. 9 is a flow chart 900 that outlines an exemplary method for developing mapping tables for data integration using data classification hierarchies, including the use of field value level semantic mapping, as can be used in certain embodiments of the disclosed technology. The mapping can be used with "main" classification hierarchies, which are designated to be used for describing the structure that MDM and external repository data will be stored in, and "alternative" (or "presentation") classification hierarchies, which can be used to create data views for specific groups of stakeholders or users. Alternative data classification hierarchies can be mapped to a main data classification hierarchy. In some examples, a main classification hierarchy can also be used as a presentation hierarchy.

At process block 910, a master data classification hierarchy including relations between one or more data elements of the hierarchy is received. The data classification hierarchy includes valid values for at least one of the data elements. The master data classification hierarchy can be generated in a number of different ways. For example, the master data classification hierarchy can be generated using the exemplary techniques described above regarding FIGS. 3-7.

The master data classification hierarchy received at process block 910 includes a description of the hierarchy levels for the MDM system, and can include, for example, data elements such as hierarchy levels and dimensions, as well as nodes and valid values and combinations for the nodes. In some examples, additional format data is received from an extended MDM repository that describes data formats, attributes, and/or fields in an MDM repository or data formats, attributes, and/or fields in an extended MDM repository. After receiving the master data classification hierarchy, the method proceeds to process block 920.

At process block 920, a number of mappings between the data elements and object fields stored in an MDM repository are generated. In some examples, at least some of the mappings are generated automatically (e.g., by analyzing an MDM repository, MDM extended repository, or using a semantic dictionary). In some examples, at least some of the mappings are generated using user input generated using a GUI. The mappings can include mappings from the data feed to the MDM system data elements and/or mappings from the MDM system to the data feed. In some examples, the mappings describe transforms from data elements in the classification hierarchy to objects stored in the MDM repository, or vice versa, or both.

Figure 12:
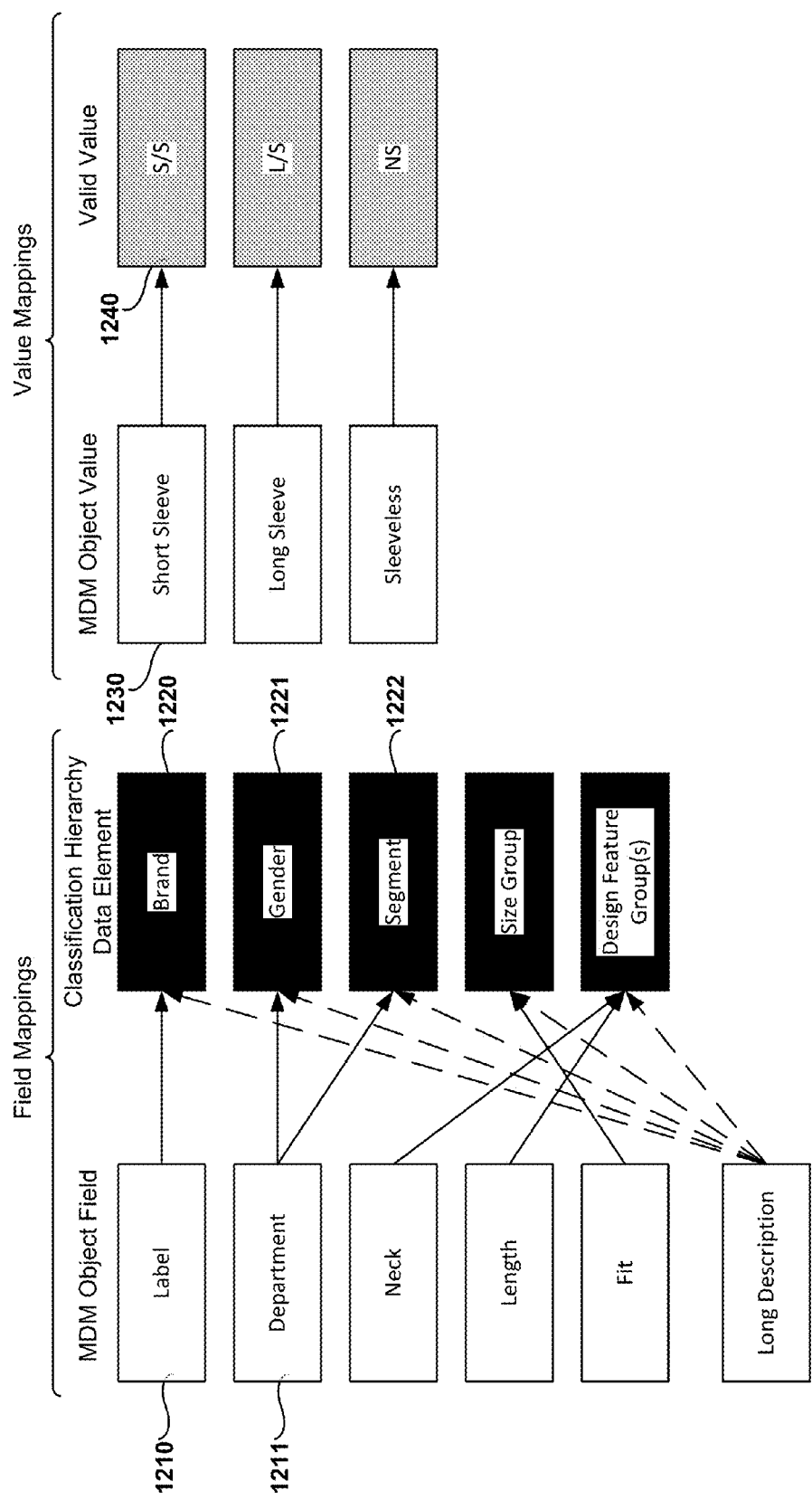
FIG. 12 illustrates a generalized example of mappings between fields and data elements, and mappings between values and valid node values as can be used in some examples of the disclosed technology.

As shown in FIG. 12, a number of data feed fields (e.g., data fields 1210 and 1211) have been mapped to a number of dimension-based fields (e.g., for a classification in an MDM system. For example, data in the MDM system stored as records corresponding to the object field "Label" 1210 are mapped to the "Brand" data element 1220 in the classification hierarchy. In this way, multiple MDM systems can be mapped to the correct corresponding fields in a generic classification hierarchy. The mappings between fields and values are not necessarily one-to-one. For example, the object field "Department" 1211 is mapped to both the "Gender" data element 1221 and the "Segment" data element 1222. Mappings between data feed fields and dimension-based fields can be provided to analysis tools, which examine descriptions associated with the mapped fields and recommend values for the corresponding attributes. For example, source data fields may not have attributes for fit, neck, or color, but instead these attributes are included in the data field description. The analysis tools tool can parse the data field description (e.g., using string parsing routines) and provide a preliminary allocation to attributes. The generated mappings can then be reviewed and approved by users.

In some examples, a user interface (e.g., an interface implemented using the Ajax Reach UI Module) guides users through generation of mappings. For example, user interface users can import a source or destination Format and selects a field or data element from a list of available fields. Then, for the selected field or data element, the user can select a matching hierarchy level to map. In some examples, the user can "drag and drop" icons representing fields onto icons representing data elements, or vice versa, or both, to generate mappings. In some examples, a user interface is used to generate a semantic mapping dictionary, which can be used to map field values. After generating the mapping(s), the method proceeds to process block 930.

At process block 930, an object value associated with an object field mapped at process block 920 is selected. For example, the object value (which is stored in an MDM repository) can be selected using a GUI or a semantic mapping dictionary. In some examples, a user can drag and drop icons representing the values to generate the mappings. After selecting an object value, the method proceeds to process block 940.

At process block 940, a mapping between the object value and at least one of the valid values for a data element mapped to the object field. For example, the user can enter or select possible values and map them to nodes of a previously mapped hierarchy level in the master data classification hierarchy. Thus, the method can be used to capture semantically equivalent terms or commonly misspelled words.

The mappings generated at process blocks 910-940 can be stored for future use as entries in an extended repository.

Example Method of Generating Data Feed/Master Data Mappings

Figure 10:
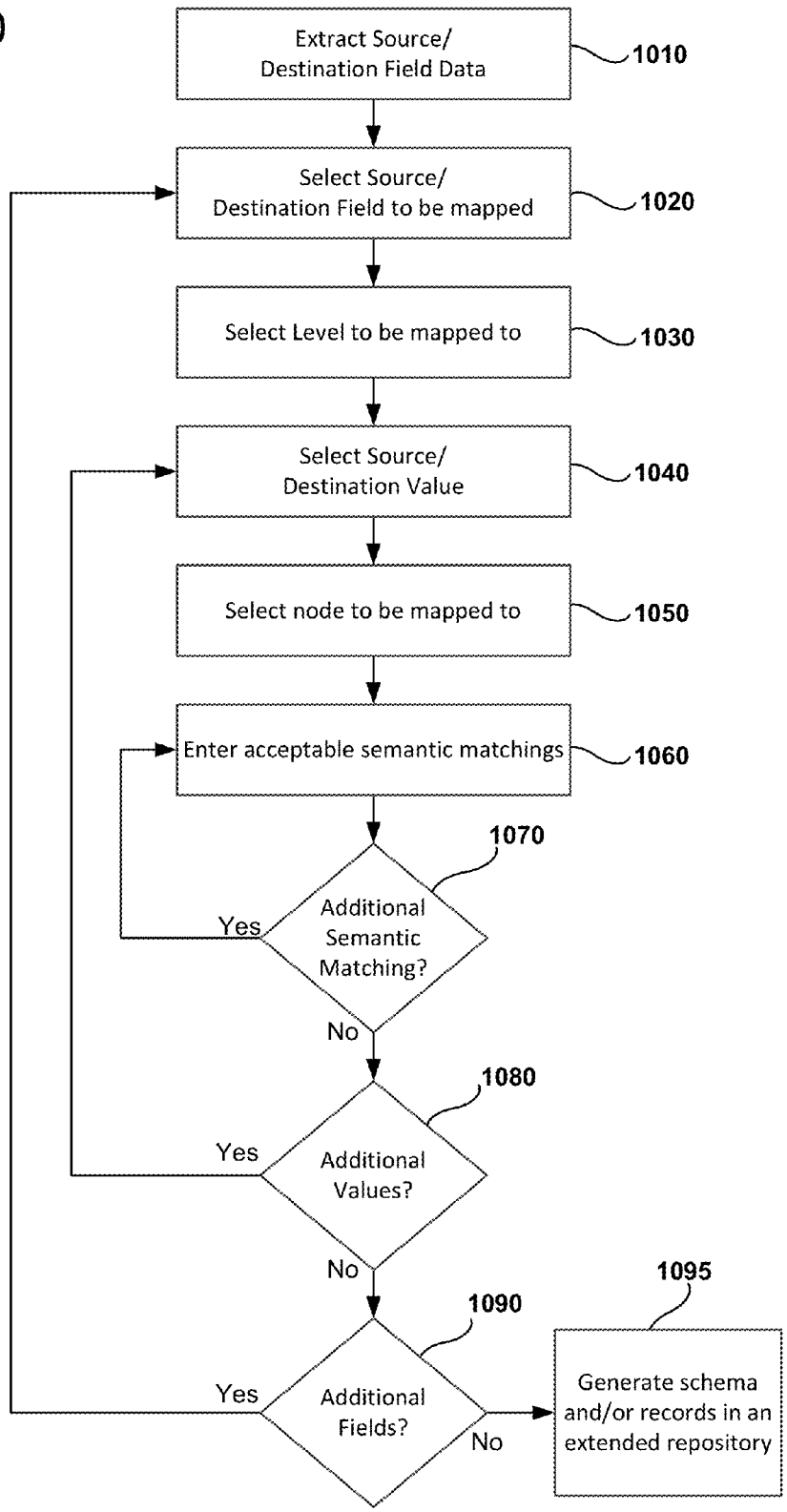
FIG. 10 is a flow chart that illustrates a generalized example of a method of generating mappings, including level and node mappings for a master data classification hierarchy.

FIG. 10 is a flow chart 1000 of another, more detailed, exemplary method of developing data element mappings and semantic matches using data classification hierarchies, as can be used in certain embodiments of the disclosed technology.

At process block 1010, source field data and destination field data is extracted from one or more MDM systems (e.g., from an MDM repository). The source and destination fields extracted are to be mapped to a classification hierarchy. In this way, fields for generating mapping from/to source/destination fields in a single MDM system, or source/destination fields across multiple MDM systems, can be generated. In some examples, a filter can be applied to extract a subset of the available source/destination fields. In some examples, the extracted fields can be displayed as a selectable list, or as icons representing the extracted fields. For example, extracted fields can be represented as rectangles, as shown in FIG. 12. After extracting source and destination field data, the method proceeds to process block 1020.

At process block 1020, one or more of the source and/or destination fields extracted at process block 1010 are selected. For example, if the fields are displayed as a list or a number of icons in a GUI, a user can select one or more fields from the list, or click on icons for one or more fields. After selecting the source and/or destination fields, the method proceeds to process block 1030.

At process block 1030, one or more data elements in a data classification hierarchy are selected to map to the source and/or destination fields selected at process block 1020. For example, as shown in FIG. 12, the Label source field 1210 has been mapped to the Brand data element 1220. In some examples, the data elements are displayed as icons, and arrows showing the relations are displayed after selecting a data element to map. In some examples, the mapping can be performed based on a text search performed based on identified matches and semantic rules. After selecting one or more data elements, the method proceeds to process block 1040.

At process block 1040, one or more of the source and/or destination values corresponding to the source and/or destination fields selected at process block 1020 are selected. In some examples, a GUI can be used to selected values in a similar manner to that discussed above regarding process block 1020. After selecting one or more source and/or destination values, the method proceeds to process block 1050.

At process block 1050, one or more nodes in a data classification hierarchy are selected to map to the source and/or destination values selected at process block 1040. For example, as shown in FIG. 12, the Short Sleeve source value 1230 has been mapped to the S/S node 1240. In some examples, the values are displayed as icons, and arrows showing the mappings are displayed after selecting a value to map. In some examples, the nodes to match to can be automatically selected by a matching algorithm (e.g., a string matching algorithm) that determines likely matches for the source and/or destination values. After mapping one or more values, the method proceeds to process block 1060.

At process block 1060, a number of acceptable semantic matches are entered. For example, during the matching process described above regarding process blocks 1010-1050, a user is matching imported/exported fields to a solution level and a node. This matching can result in complex node names (e.g., "Shirt V-neck Long Sleeve . . . "), so there is a possibility that multiple matches from external sources may have to be mapped to the defined set. After identifying new possible valid matches for a particular node name, they can be entered in a matching engine, thereby training the matching engine. After entering an acceptable semantic matching, the method proceeds to process block 1070.

At process block 1070, the method determines whether additional semantic matches are to be made. If so, the method proceeds to process block 1060. For example, if a new term or multiple matches are determined, additional semantic matches are generated by proceeding to process block 1060, otherwise, the method proceeds to process block 1080.

At process block 1080, the method determines whether there are additional source/destination values to map. If so, the method proceeds to process block 1040 to select additional values for the selected field/data element combination, otherwise, the method proceeds to process block 1090. For example, a user can select additional values to map using a GUI, or a non-empty list of values can be processed to determine whether there are additional values to map.

At process block 1090, the method determines whether there are additional source/destination fields to map. If so, the method proceeds to process block 1020 to select additional fields in an MDM environment. Otherwise, the method proceeds to process block 1095.

At process block 1095, entering of data elements and node mappings is completed. For example, the MDM PAIP system can generate and store schema and/or other records for the mappings generated at process block 1010-1090 in an extended repository. In some examples, a semantic dictionary is generated that includes the generated mappings.

Example Method of Mapping Unmapped Values and Nodes

Figure 11:
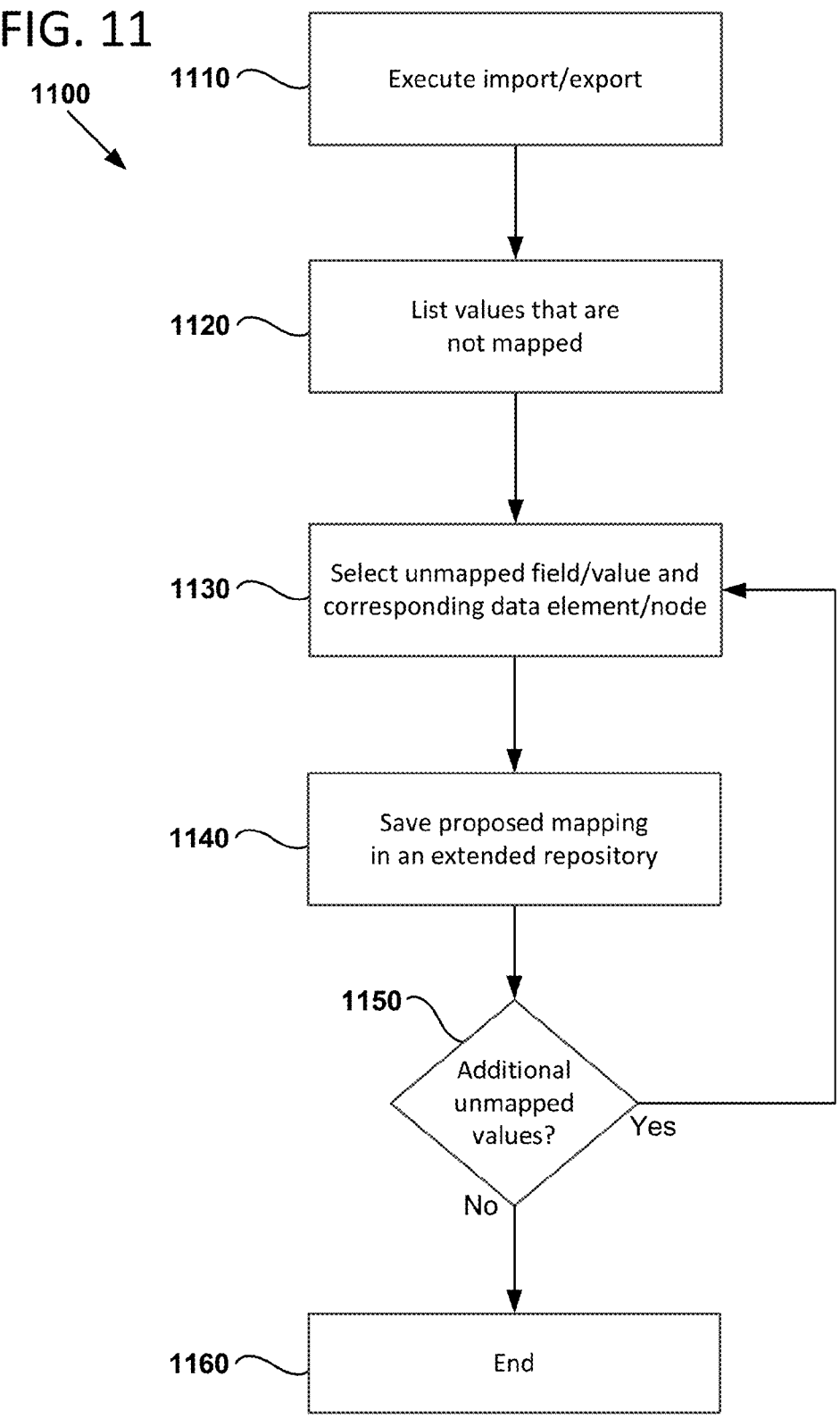
FIG. 11 is a flow chart that illustrates a generalized example of a method of mapping previously-unmapped fields and/or values for an MDM system to a master data classification hierarchy.

FIG. 11 is a flow chart 1100 of another, more detailed, exemplary method of developing data element mappings and semantic matches by matching previously unmatched values and nodes, as can be used in certain embodiments of the disclosed technology. In particular, the flow chart 1100 outlines a method of mapping data import errors to a semantic dictionary. For example, a semantic dictionary can store a number of valid semantic matches determined at process block 1060 of the method outlined in FIG. 10.

For example, when MDM data is imported based on previously-defined class hierarchies and previously-defined semantic mappings, there can be some values that will have a valid match defined. For example, changes to source/destination fields or values, or changes to data elements or nodes in a class hierarchy, can result in undefined matches.

At process block 1110, an import/export routine is executed to process data based on previously-mapped source/destination fields and values in an MDM system. The import/export routine determines whether any fields or values are not matched, and if so, adds them to a list. After processing the import/export on an MDM system, the method proceeds to process block 1120.

At process block 1120, a number of values and/or fields that are not matched are displayed. For example, a list of values and corresponding records to be mapped can be displayed, with any unmatched values highlighted in a GUI.

At process block 1130, mappings for unmatched fields/values and corresponding data elements/nodes can be selected. For example, a user can select an unmatched value and select the appropriate matching level and node in a class hierarchy that is displayed using a GUI. After the proposed mapping(s) for unmatched fields/values are selected, the method proceeds to process block 1140.

At process block 1140, entering of the proposed mapping(s) generated at process block 1130 is completed. For example, the MDM PAIP system can generate and store schema and/or other records for the proposed mappings in an extended repository. In some examples, a semantic dictionary is generated that includes the proposed mappings. After storing data for the proposed mappings, the method proceeds to process block 1150.

At process block 1150, the method determines whether there are additional unmatched values based on the list that was generated at process block 1120. If there are additional unmatched values, the method proceeds to process block 1130 to select additional unmatched fields or values. Otherwise, the method proceeds to process block 1160.

At process block 1160, mapping of unmatched fields and/or values is completed. For the MDM PAIP system can generate and store schema and/or other records for the mappings in an extended repository.

Example Method of Mapping to Multiple Presentation Hierarchies

Figure 13:
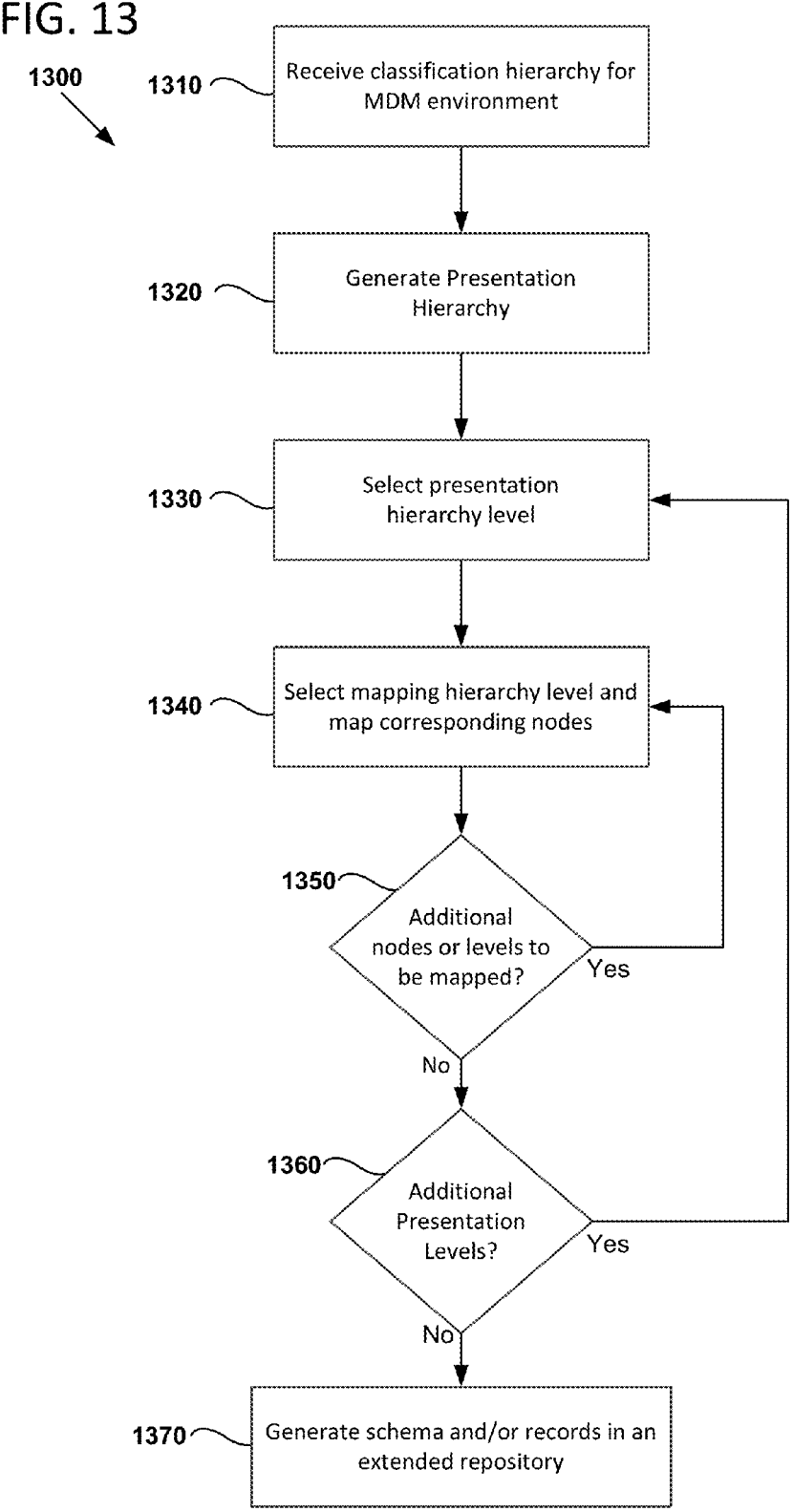
FIG. 13 is a flow chart that illustrates a generalized example of a method of mapping a presentation hierarchy level to a master data classification hierarchy.

FIG. 13 is a flow chart 1300 that outlines an exemplary method of generating a presentation hierarchy for a number of presentation views and mapping corresponding nodes of a classification hierarchy to a level of the presentation hierarchy, as can be used in certain embodiments of the disclosed technology. Mapping a classification hierarchy to multiple presentation views allows various categories or roles of users to see data presented in a manner customized to their role.

A user interface guides a user through a group of activities, thus enabling the mapping of a classification hierarchy to multiple presentation hierarchies.

At process block 1310, a classification hierarchy for an MDM environment is received. The classification hierarchy can be defined using similar techniques as those described earlier in this regarding FIGS. 3-7. After receiving the classification hierarchy, the method proceeds to process block 1320.

At process block 1320, one or more presentation hierarchies are defined. For example, a user can define a desired presentation hierarchy using a GUI, including the use of similar techniques as those described above regarding classification hierarchies. After defining the presentation hierarchies, the method proceeds to process block 1330.

At process block 1330, a level of the presentation hierarchy is selected. For example, a user can select a presentation hierarchy level form a list or from a graphical representation of the presentation hierarchy defined at process block 1320. After selecting a presentation hierarchy level, the method proceeds to process block 1340.

At process block 1340, a matching hierarchy level of the classification hierarchy is selected. For example, a user can select a level of a main classification hierarchy, or a level of an alternative hierarchy level. A number of nodes associated with the selected level of the classification hierarchy can be associated to the selected presentation hierarchy level. In some examples, a user can select all the corresponding nodes, or only a subset of corresponding nodes, depending on the desired classification view. After the classification hierarchy level and corresponding nodes, the method proceeds to process block 1350.

At process block 1350, the method determines whether there are additional nodes or levels of the classification hierarchy to be mapped. For example, a user can enter input to indicate whether there additional nodes or levels to be mapped. If there are additional nodes or levels to be mapped, the method proceeds to process block 1340, otherwise the method proceeds to process block 1360.

At process block 1360, the method determines whether there are additional presentation levels of one of the presentation hierarchies generated at process block 1320 to be mapped. If there are additional presentation levels to be mapped, the method proceeds to process block 1330 to select additional presentation levels, otherwise the method proceeds to process block 1370.

At process block 1370, the MDM PAIP system can generate and store schema and/or other records for the presentation views as entries in an extended repository. The data for the presentation views can be used by a GUI to present MDM environment data to users based on a selected presentation view.

Figure 14:
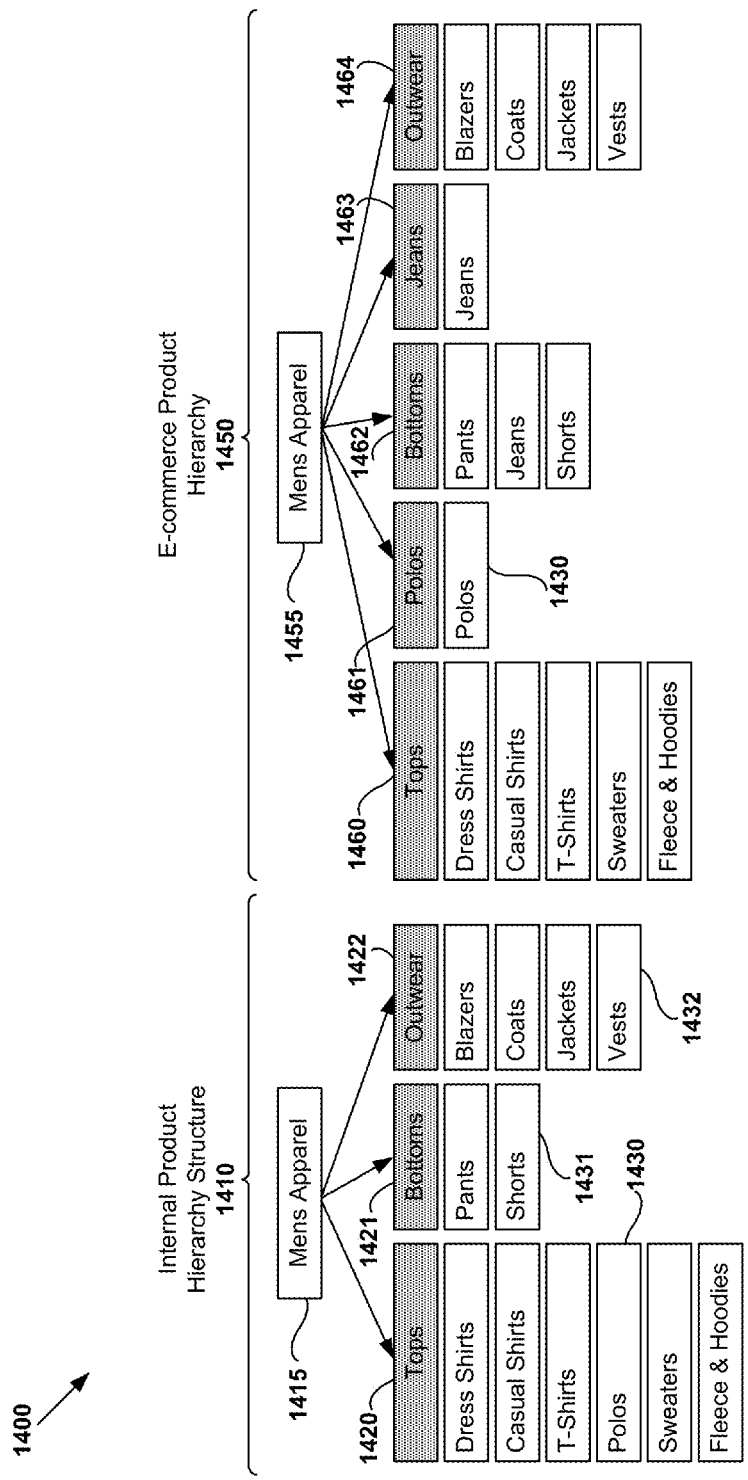
FIG. 14 illustrates a generalized example of two different presentation hierarchies that have been mapped to a master data classification hierarchy.

For example, FIG. 14 is a diagram 1400 that illustrates two presentation hierarchies 1410 and 1450. As shown, a first presentation hierarchy 1410 includes a root level "Mens Apparel" 1415 that has three child levels 1420-1422. Each of the child levels includes a number of values (e.g., Polos 1430, Shorts 1431, and Vests 1432). This first presentation hierarchy 1410 was developed for use by a user in an internal product role within an organization. Also shown is a second presentation hierarchy 1450 developed for a use by a user in an E-commerce product role within the same organization. As shown, a root node Mens Apparel 1455 has five child levels 1460-1464, and includes nodes defined at a different level than the first presentation hierarchy 1410. For example, the node value "Polos" 1430 is located under the Tops level 1420 in the first presentation hierarchy 1410, but the same node value "Polos" is located under the Polos level 1461 in the second presentation hierarchy. In this way, the same underlying data in the MDM environment can be arranged as desired for different user roles without the need to redefine the underlying MDM hierarchy. For example, polo shirts (e.g., shirts associated with the Polos value 1430) might be sold and tracked using a distinct category online (e.g., a website developed based on the E-commerce Product hierarchy 1450) while the same product might be sold and tracked together with T-shirts and Sweaters at bricks-and-mortar locations.

Example Computing Environment

Figure 15:
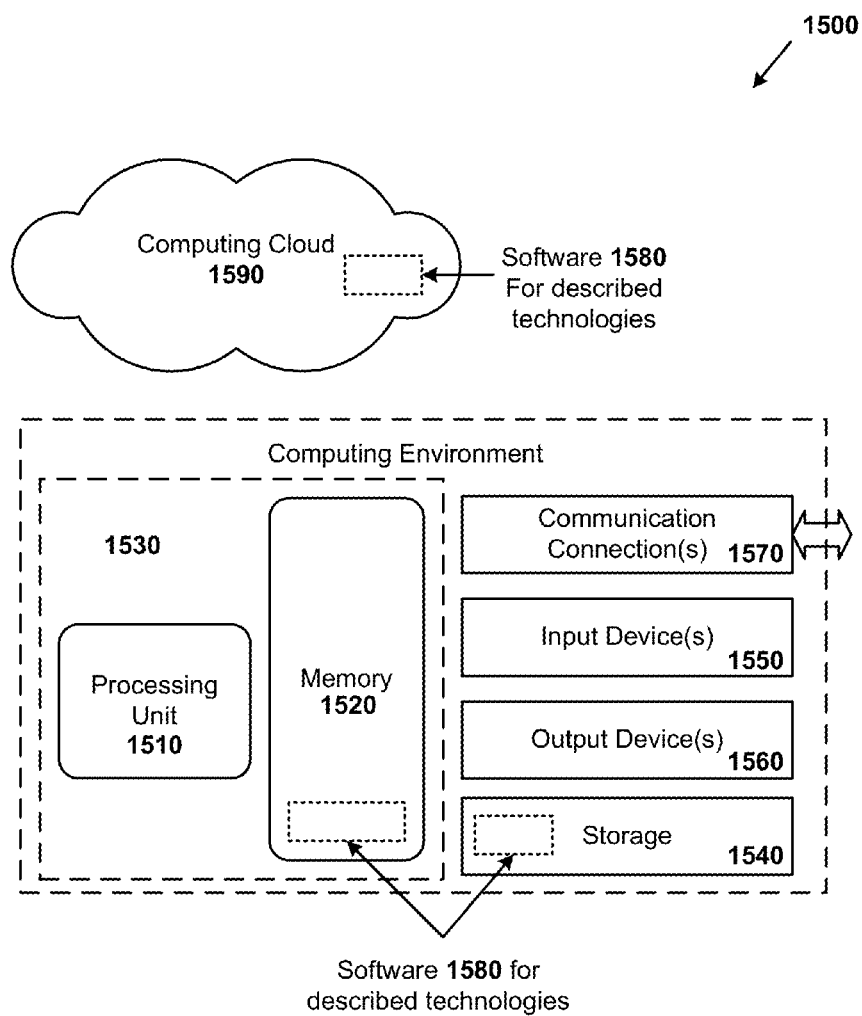
FIG. 15 illustrates a generalized example of a suitable computing environment in which described embodiments, techniques, and technologies can be implemented.

FIG. 15 illustrates a generalized example of a suitable computing environment 1500 in which described embodiments, techniques, and technologies may be implemented. For example, the computing environment 1500 can implement generating class hierarchies, mapping class hierarchies, and developing presentation hierarchies, as described above.

The computing environment 1500 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 15, the computing environment 1500 includes at least one central processing unit 1510 and memory 1520. In FIG. 15, this most basic configuration 1530 is included within a dashed line. The central processing unit 1510 executes computer-executable instructions and may be a real or a virtual processor. In a multi-processing system, multiple processing units execute computer-executable instructions to increase processing power and as such, multiple processors can be running simultaneously. The memory 1520 may be volatile memory (e.g., registers, cache, RAM), non-volatile memory (e.g., ROM, EEPROM, flash memory, etc.), or some combination of the two. The memory 1520 stores software 1580 that can, for example, implement the technologies described herein. A computing environment may have additional features. For example, the computing environment 1500 includes storage 1540, one or more input devices 1550, one or more output devices 1560, and one or more communication connections 1570. An interconnection mechanism (not shown) such as a bus, a controller, or a network, interconnects the components of the computing environment 1500. Typically, operating system software (not shown) provides an operating environment for other software executing in the computing environment 1500, and coordinates activities of the components of the computing environment 1500.

The storage 1540 may be removable or non-removable, and includes magnetic disks, magnetic tapes or cassettes, CD-ROMs, CD-RWs, DVDs, or any other medium which can be used to store information and that can be accessed within the computing environment 1500. The storage 1540 stores instructions for the software 1580 and image data, which can implement technologies described herein.

The input device(s) 1550 may be a touch input device, such as a keyboard, keypad, mouse, touch screen display, pen, or trackball, a voice input device, a scanning device, or another device, that provides input to the computing environment 1500. For audio, the input device(s) 1550 may be a sound card or similar device that accepts audio input in analog or digital form, or a CD-ROM reader that provides audio samples to the computing environment 1500. The output device(s) 1560 may be a display, printer, speaker, CD-writer, or another device that provides output from the computing environment 1500.

The communication connection(s) 1570 enable communication over a communication medium (e.g., a connecting network) to another computing entity. The communication medium conveys information such as computer-executable instructions, compressed graphics information, video, or other data in a modulated data signal.

Some embodiments of the disclosed methods can be performed using computer-executable instructions implementing all or a portion of the disclosed technology in a computing cloud 1590. Storing and persisting MDM records and classification hierarchies can be performed on servers located in the computing cloud 1590.

Computer-readable media are any available media that can be accessed within a computing environment 1500. By way of example, and not limitation, with the computing environment 1500, computer-readable media include memory 1520 and/or storage 1540. As should be readily understood, the term computer-readable storage media includes the media for data storage such as memory 1520 and storage 1540, and not transmission media such as modulated data signals.

Any of the methods described herein can be performed via one or more computer-readable media (e.g., storage or other tangible media) comprising (e.g., having or storing) computer-executable instructions for performing (e.g., causing a computing device to perform) such methods. Operation can be fully automatic, semi-automatic, or involve manual intervention.

Having described and illustrated the principles of our innovations in the detailed description and accompanying drawings, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims and their equivalents.

We claim:

1. A computer-implemented method of developing master data classifications for a master data management (MDM) environment, the method comprising:
   receiving a classification hierarchy defining one or more dimensions and one or more relations between a set of hierarchy levels, each of the hierarchy levels representing a collection of related objects in the MDM environment, and each of the dimensions representing a set of valid values for one or more nodes in the classification hierarchy;
   generating a dimensional level by associating at least one of the dimensions with a level of the set of hierarchy levels, the at least one dimension defining a set of valid values for nodes associated with the dimensional level;
   associating the dimensional level with one or more nodes;
   receiving first input designating a node in the classification hierarchy as a dimensional node;
   receiving selection input selecting two or more nodes to be associated with the dimensional node as dimensional combinations;
   based on the selected nodes, selecting valid dimension values for the dimensional node; and
   by a computer, generating master data classifications for the MDM environment based on the classification hierarchy and the associated nodes, the master data classifications including one or more objects assigned valid values based on the dimensional level and the associated nodes, the master data classifications including the valid dimension values for the dimensional node.

2. The method of claim 1, wherein the at least one dimension is an independent dimension associated with a respective one or more of the hierarchy levels regardless of values for nodes associated with the respective hierarchy level.

3. The method of claim 1, wherein the at least one dimension is a dependent dimension, wherein valid values for nodes associated with a respective one or more of the hierarchy levels for the dependent dimension are based at least in part on a value for a different node in the classification hierarchy.

4. The method of claim 1, wherein the generating the master data classifications further comprises:
   receiving first input indicating that one of the dimensions is an independent dimension;
   receiving second input indicating valid values for the independent dimension;
   defining one or more dimensional levels based on the indicated valid values assigned to the indicated independent dimension.

5. The method of claim 1, further comprising defining the classification hierarchy by defining hierarchical relations between two or more levels of the classification hierarchy.

6. The method of claim 1, further comprising:
   storing the master data classifications in an MDM repository;
   generating a revised classification hierarchy based on the received classification hierarchy, the dimensional level, and the associated nodes; and
   storing the revised classification hierarchy in an extended repository.

7. The method of claim 1, further comprising generating valid combinations for master data classification objects based on the dimensional level.

8. The method of claim 1, further comprising storing schemas, database records, or schemas and database records for the master data classifications in the MDM environment.

9. The method of claim 1, wherein not all possible combinations or dimensions associated with a respective hierarchy level are used as valid levels for at least one of the nodes associated with the dimensional level.

10. The method of claim 1, wherein the method further comprises activating a data synchronizer to update at least one MDM repository in the MDM environment when data changes are detected in the MDM environment.

11. One or more non-transitory computer-readable media storing computer-readable instructions that when executed by a computer, cause the computer to perform a method of generating mappings between objects in an MDM repository and a master data classification hierarchy stored in an extended repository, the method comprising:
   receiving the master data classification hierarchy, the classification hierarchy defining relations between data elements of the classification hierarchy, the classification hierarchy including definitions of valid values for one or more of the data elements;

based on the master data classification hierarchy, generating one or more mappings between the data elements and a respective one or more object fields stored in the MDM repository to produce mapped object fields;

generating a set of unmapped object fields, unmapped object values, or unmapped object fields and unmapped object values stored in the MDM repository;

generating a set of unmapped data elements, unmapped valid values, or unmapped data elements and unmapped valid values in the classification hierarchy;

receiving input indicating a mapping between at least one or more of the unmapped object fields, object values, and unmapped object fields and object values, and at least one or more of the unmapped data elements, an unmapped valid values, and the unmapped data elements and an unmapped valid values; and based on the indicated mapping, generating a mapping between the indicated fields, the indicated values, or the indicated fields and the indicated values.

12. The computer-readable media of claim 11, wherein the method further comprises:

selecting an object value associated with at least one of the mapped object fields, the object value being stored in the MDM repository; and generating a mapping between the object value and one or more valid values for a data element mapped to the object field, the value values being determined by at least one of the relations of the master data classification hierarchy.

13. The computer-readable media of claim 11, wherein the method further comprises storing the mappings in an extended repository.

14. The computer-readable media of claim 11, wherein the mappings are generated using drag-and-drop functionality of a graphical user interface.

15. The computer-readable media of claim 11, wherein the method further comprises storing object data in the MDM repository based on the mapping.

16. The computer-readable media of claim 11, wherein the generating the mapping is performed automatically by using at least one or more of the following: an MDM repository, an MDM extended repository, or a semantic dictionary.

17. A computer-implemented method of generating two or more presentation hierarchies for an MDM environment, the method comprising:

receiving a classification hierarchy for the MDM environment, generating a first presentation hierarchy and a second presentation hierarchy for the MDM environment, each of the presentation hierarchies being associated with a user role in the MDM environment, each of the presentation hierarchies including one or more presentation levels, one or more nodes of the first presentation hierarchy being mapped differently than one or more nodes of the second presentation hierarchy without redefining the classification hierarchy;

selecting one of the presentation levels;

selecting a level of the classification hierarchy to map to the selected presentation level; and by a computer, generating a mapping between the selected level of the presentation hierarchy and one or more corresponding nodes of the selected classification hierarchy level.

18. The method of claim 17, further comprising presenting data from the MDM environment based on a selected presentation hierarchy, the presentation hierarchy being selected based on a user role in the MDM environment.

19. The method of claim 17, wherein the first presentation hierarchy is for internal use within an organization and the second presentation hierarchy is for use in an E-commerce product role.

20. A system comprising:

one or more processors configured to execute the computer-readable instructions stored on the computer-readable media of claim 11.

* * * * *